United States Patent [19]
Nemoto et al.

[11] Patent Number: 5,432,669
[45] Date of Patent: Jul. 11, 1995

[54] SUPERCONDUCTING MAGNET APPARATUS FOR MAGNETICALLY LEVITATED TRAIN

[75] Inventors: Kaoru Nemoto, Zushi; Hiroki Kamijo; Akihiko Kishikawa, both of Tokyo; Eiji Suzuki, Tokyo, all of Japan

[73] Assignee: Railway Technical Research Institute, Japan

[21] Appl. No.: 142,911

[22] Filed: Oct. 28, 1993

[30] Foreign Application Priority Data

Nov. 19, 1992 [JP] Japan .................................. 4-333548
Jul. 27, 1993 [JP] Japan .................................. 5-203742
Sep. 3, 1993 [JP] Japan .................................. 5-219437

[51] Int. Cl.6 ......................... B60L 13/00; H01F 6/00
[52] U.S. Cl. ................... 361/143; 335/216; 104/281
[58] Field of Search .................. 361/139, 141, 143; 335/216; 104/281, 282

[56] References Cited

U.S. PATENT DOCUMENTS

| | | | |
|---|---|---|---|
| 3,845,720 | 11/1974 | Bohn et al. | 104/130 |
| 4,273,054 | 6/1981 | Yamashita et al. | 104/281 |
| 4,356,772 | 11/1982 | van der Heide | 104/282 |
| 5,249,529 | 10/1993 | Herbermann | 104/281 |

FOREIGN PATENT DOCUMENTS 140103 8/1983 Japan .
148601 9/1983 Japan .

OTHER PUBLICATIONS

IEEE Transactions on Magnetics. vol. 27, No. 2, Mar. 1991, pp. 2272–2275.

*Primary Examiner*—Jeffrey A. Gaffin
*Attorney, Agent, or Firm*—Lorusso & Loud

[57] ABSTRACT

A superconducting magnet apparatus according to the present invention has serially connected superconducting magnets, which are energized and de-energized via disconnectors from a power supply installed on a vehicle of the train, mounted in a pair on both sides of a magnetically levitated train that oppose guiding ground coils of a magnetically levitated railway when the magnetically levitated train is traveling, each superconducting magnet has a plurality of serially connected superconducting coils, persistent current switches are parallel-connected across respective ones of the superconducting coils, and demagnetizers are provided for linking and changing over corresponding persistent current switches mounted in pairs on both sides of the magnetically levitated train. The superconducting magnet apparatus is provided with an interconnecting normal conductive line which, when the power supply is cut off from the disconnectors, is connected between current lead wires, which are nearest to the power supply, on a load side of the disconnectors, for serially interconnecting all of the superconducting coils so that a circulating current can be passed through them, and protective resistors having resistance values of such size that when a superconducting coil undergoes a normal conductive transition and current in the superconducting coil opposing this superconducting coil is commutated from the persistent current switch, this opposing superconducting coil is caused to undergo a normal conductive transition.

14 Claims, 31 Drawing Sheets

1

SUPERCONDUCTING MAGNET APPARATUS FOR MAGNETICALLY LEVITATED TRAIN

BACKGROUND OF THE INVENTION

This invention relates to a superconducting magnet apparatus mounted on a magnetically levitated train and, more particularly, to a superconducting magnet apparatus mounted on a magnetically levitated train in a magnetic guidance system in which ground coils for guidance arranged on both sides of a guideway are connected by null-flux lines, wherein the superconducting magnet apparatus is arranged to oppose the guidance ground coils.

As illustrated in FIG. 1, superconducting magnets 10 are disposed in left-right symmetry on both sides of a truck 12 located below the floor of a vehicle 11, and each superconducting magnet 10 internally incorporates a plurality of superconducting coils 1. Ground coils 13 for guidance are arranged on side walls 14 of a guideway.

In the case of a specific example of a superconducting magnet used in the Magnetically Levitated Vehicle MLU 002 of the Miyazaki Test Track, Kyushu, Japan, developed by the RTRI (Railway Technical Research Institute) and illustrated on pages 18 and 19 of "Approach to the 21st Century at 500 km/h" published by the Transportation News, one superconducting magnet is disposed on each of the two sides of the truck, and each superconducting magnet internally accommodates 30 superconducting coils. FIG. 2 shows the circuitry of a conventional superconducting magnet apparatus for a magnetically levitated train in a case where three pairs of superconducting coils are arranged on both sides of a truck.

As shown in FIG. 2, persistent current switches $2a \sim 2f$ and protective resistors $3a \sim 3f$ are connected to superconducting coils $1a \sim 1f$, respectively. Heretofore the protective resistors $3a \sim 3f$ have been selected to have a resistance value R that will not induce a normal conductive transition in the superconducting coils when the persistent current switches $2a \sim 2f$ are changed over to the open state.

More specifically, on the basis of actual results obtained with superconducting coils for use in a magnetically levitated train, the resistance value R selected is such that a time constant $\tau = L/R$ of current attenuation will be approximately 40 sec with regard to a self-inductance $L$ ($= 1.5 \sim 4$ H). For example, in the case of the superconducting magnets used in the above-mentioned magnetically levitated train MLU 002, the resistance value of the protective resistors is set at $0.07 \Omega$ when the self-inductance of the superconducting coils is 3 H.

Further, in FIG. 2, numeral 4 denotes a demagnetizer for changing over the persistent switches $2a \sim 2f$ to the open state, and numeral 5 denotes a power supply used when energizing and de-energizing the superconducting coils $1a \sim 1f$. When the superconducting coils $1a \sim 1f$ are in a persistent-current mode (the superconducting state), i.e., when the vehicle is running, the superconducting coils $1a \sim 1f$ are cut off from the power supply 5 by disconnectors 6. Numerals $7a \sim 7g$ designate current lead wires, $8a$, $8b$ power-supply cables, $10a$, $10b$ superconducting magnets and 12 the truck.

FIG. 3 is a diagram illustrating the positional relationship between superconducting coils and ground coils for guidance, as well as the magnetic flux, which prevails when a magnetically levitated train is running in the vicinity of an equilibrium position owing to a magnetic guiding force. Numerals $13a$, $13b$ denote ground coils for guidance, and numeral 15 represents a null-flux line interconnecting the guiding ground coils $13a$ and $13b$.

In a case where the superconducting magnet apparatus is not operating abnormally and the train is being levitated in the vicinity of the equilibrium position by a magnetic guiding force, the magnetic fluxes produced by the superconducting coils $1a$, $1b$ interlink with fluxes of substantially the same magnitude with respect to the guiding ground coils $13a$, $13b$, respectively, on both sides, as illustrated in FIG. 3.

The guiding ground coils $13a$, $13b$ on both sides are null-flux connected by the null-flux line 15. Consequently, when fluxes of approximately the same magnitude interlink, the induced voltages of the guiding ground coils $13a$ and $13b$ cancel each other out and the current becomes small. Accordingly, the electromagnetic forces between the superconducting coils $1a$, $1b$ and guiding ground coils $13a$, $13b$ also become small and so does the magnetic guiding force.

FIG. 4 is a diagram illustrating the positional relationship between the superconducting coils and the ground coils for guidance, as well as the magnetic flux, which prevails when the train is running while undergoing a displacement in the horizontal direction from the equilibrium position.

In a case where the superconducting magnet apparatus is not operating abnormally and the train has been displaced in the horizontal direction from the equilibrium position, the spacing between the superconducting coil $1b$ and guiding ground coil $13b$ on the left side differs from the spacing between the superconducting coil $1a$ and guiding ground coil $13a$ on the right side, as shown in FIG. 4, and therefore a difference is produced in the magnetic fluxes interlinking with the respective guiding ground coils.

Since the left and right ground coils for guidance are null-flux connected by the null-flux wire 15, a repulsive force acts between the guiding ground coil $13a$ having the larger linkage flux and the superconducting coil $1a$, and an attractive force acts between the guiding ground coil $13b$ having the smaller linkage flux and the superconducting coil $1b$. As a result, a restoring force, namely a magnetic guiding force, that attempts to restore the displacement to the equilibrium position is produced.

If a superconducting coil undergoes a normal conductive transition from the superconductive state for some reason while the train is running, the current of this superconducting coil will be attenuated to zero in several seconds and the magnetic flux interlinked with the guiding ground coil will also decrease sharply.

FIG. 5 is a diagram illustrating the positional relationship between the superconducting coils and the ground coils for guidance, as well as the magnetic flux, which prevails when the superconducting coil on one side of a train undergoes a normal conductive transition.

When the superconducting coil $1a$ has undergone a normal conductive transition, the magnetic flux interlinking with the guiding ground coil $13a$ becomes almost zero, as shown in FIG. 5. On the other hand, since the magnetic flux interlinking with opposing guiding ground coil $13b$ remains almost unchanged, a very large difference is produced between the magnetic fluxes interlinked with the left and right guiding ground coils irrespective of the traveling position of the vehicle, and a large current is induced in the guiding ground coils null-flux connected by the null-flux line 15.

As a result, a large electromagnetic repulsive force is produced between the guiding ground coil 13b and the superconducting coil 1b that has not undergone the normal conductive transition, and this causes the train to be pushed against the guideway side wall on the side of the superconducting coil 1a that has experienced the normal conductive transition.

In order to deal with this problem, the specification of Japanese Patent Application Laid-Open No. 58-148601 discloses a method of serially connecting the superconducting coils electrically every pair of left and right coils. With this method, the currents in the left and right superconducting coils are rendered equal at all times even if the superconducting coil on one side undergoes a normal conductive transition. Consequently, the symmetry of the magnetic fields is maintained and an abnormal electromagnetic force is not produced in the lateral direction.

However, a difficulty is encountered in that since it is required for the left and right superconducting coils to be connected by superconducting lines, vacuum-insulated piping for cooling the superconducting lines must be disposed between the left and right superconducting coils. Since the left and right superconducting coils of the traveling magnetically levitated train possess independent modes of vibration, the vacuum-insulated piping undergoes deformation such as twisting and bending and cracks readily develop in the vacuum-tight portions. The proposed method has not yet been put into practical use for this reason.

Further, the specification of Japanese Patent Application Laid-Open No. 58-140103 discloses a proposal in which, when a superconducting coil undergoes a normal conductive transition, a demagnetizer (or a superconductive breakdown sensor) feeds a current into a heater attached to the superconducting coil so that the opposing superconducting coil is made to undergo a normal conductive transition. With this method there is no need for cooling piping connecting the left and right superconducting coils and, hence, there is no influence from vibration.

However, sufficient reliability is not assured with regard to preventing normal conductive transition of a superconducting coil caused by malfunction of the demagnetizer resulting from lightning during traveling of the train, electrical discharge due to frictional electrification or alternating magnetic fields from the ground coils on the sides of the guideway, or normal conductive transition of a superconducting coil as a form of malfunction caused by the heater of the superconducting coil being heated by an induced voltage impressed upon the circuit extending from the demagnetizer to the heater. Since the normal conductive transition of an energized superconducting coil is accompanied by the evaporation of valuable liquid helium owing to the heat produced, this must be avoided to the utmost except in case of emergencies. Thus, since the method of attaching a heater to the superconducting coil does not assure reliability in terms of preventing malfunction, this method has not been put into practical use so far.

In the conventional superconducting magnet apparatus for magnetically levitated trains of the kind shown in FIG. 2, the superconducting coil 1b produces an induced voltage when it undergoes a normal conductive transition or when the persistent current switch 2b is changed over to the open state. Accordingly, the practice heretofore has been to sense this induced voltage by the demagnetizer 4 and cause the demagnetizer 4 to change over both of the opposing persistent current switches 2a, 2b to the open state.

If the persistent current switches 2a, 2b are changed over to the open state for some reason in this conventional superconducting magnet apparatus, the currents of the superconducting coils flowing into the persistent current switches 2a, 2b are commutated to protective resistors 3a, 3b of small resistance value so that the currents will be attenuated and de-energization achieved without the superconducting coils undergoing the normal conductive transition.

Accordingly, the normal conductive transition of superconducting coils will not be induced even if the demagnetizer 4 malfunctions.

However, when one of the superconducting coils, say the superconducting coil 1b, experiences a normal conductive transition for some reason, the opposing persistent current switch 2a is merely changed over to the open state and the opposing superconducting coil 1a does not undergo a normal conductive transition since the resistance value of the protective resistor 3a is a low $0.07\Omega$ and, hence, the current is attenuated slowly. On the other hand, the superconducting coil 1b that has undergone the normal conductive transition is de-energized in several seconds whereas it takes several minutes for the opposing superconducting coil 1a to de-energize. Consequently, the magnetic field symmetry on the left and right sides is lost completely and there is almost no effect in terms of mitigating the abnormal electromagnetic force that thrusts the train against the side wall.

Accordingly, a large amount of structural material for strengthening the guideway is required and the cost of constructing the guideway in inevitably very high. This is a particularly serious problem considering the long distance of the line between such cities as Tokyo and Osaka.

Thus, when the superconducting coil on just one side of a magnetically levitated train undergoes a normal conductive transition, the train is thrust against a side wall of the guideway by an excessively large electromagnetic force. In order to prevent this, it is required that the superconducting coil on the opposite side opposing the superconducting coil that has undergone the normal conductive transition also be made to undergo the normal conductive transition so that the symmetry of the magnetic fields may be maintained. In addition, the mechanism that causes the opposing superconducting coil to undergo the normal conductive transition must be easy to realize, highly reliable and fail-safe.

SUMMARY OF THE INVENTION

In order to solve the aforementioned problems, an object of the present invention is to provide a superconducting magnetic apparatus for a magnetically levitated train in which, when a superconducting coil undergoes a normal conductive transition during traveling of the train, the opposing superconducting coil also is made to undergo the normal conductive transition within one second. Further, when a persistent current switch is changed over to the open state during traveling of the train, the persistent current switch of the opposing superconducting coil also is changed over to the open state so that this superconducting coil will not be allowed to undergo the normal conductive transition.

Furthermore, even if a demagnetizer should happen to malfunction, normal conductive transition of superconducting coils will not be brought about. The superconducting magnet apparatus is capable of guiding a magnetically levitated train in a highly reliable manner by performing these operations.

According to the present invention, the foregoing object is attained by providing:

(1) A superconducting magnet apparatus for a magnetically levitated train in which serially connected superconducting magnets, which are energized and de-energized via disconnectors from a power supply installed on a vehicle of the train, are provided by being mounted in a pair on both sides of the magnetically levitated train that oppose guiding ground coils of a magnetically levitated railway when the magnetically levitated train is traveling, each superconducting magnet has a plurality of serially connected superconducting coils, persistent current switches are parallel-connected across respective ones of the superconducting coils, and demagnetizers are provided for linking and changing over corresponding persistent current switches mounted in pairs on both sides of the magnetically levitated train, the superconducting magnet apparatus being provided with an interconnecting normal conductive line which, when the power supply is cut off from the disconnectors, is connected between current lead wires, which are nearest to the power supply, on a load side of the disconnectors, for serially interconnecting all of the superconducting coils so that a circulating current can be passed through them, and protective resistors having resistance values of such size that when a superconducting coil undergoes a normal conductive transition and current in the superconducting coil opposing this superconducting coil is commutated from the persistent current switch, this opposing superconducting coil is caused to undergo a normal conductive transition.

(2) In (1) mentioned above, the protective resistors are connected in parallel with corresponding ones of the superconducting coils.

(3) In (2) mentioned above, the interconnecting normal conductive line is provided with a switch or with connecting portions by which the interconnecting normal conductive line is capable of being freely detached.

(4) In (2) mentioned above, a diode is serially connected to each protective resistor in such a direction that it will pass only the current produced by the superconducting coil to which the protective resistor is serially connected.

(5) In (2) mentioned above, each protective resistor has a resistance value R and each superconducting coil has a self-inductance L, where the relation $9 \geq L/R$ holds.

(6) In (4) mentioned above, a current-attenuation adjusting resistor, which has a resistance value that does not undergo a normal conductive transition, is connected to the interconnecting normal conductive line when a persistent current switch malfunctions and the current of the superconducting coil is commutated from the persistent current switch.

(7) In (6) mentioned above, the current-attenuation adjusting resistor has a resistance value r and each superconducting coil has a self-inductance L, where the relation $19 \leq L/r$ holds.

(8) In (6) mentioned above, a diode is serially connected to the current-attenuation adjusting resistor.

(9) In (6) mentioned above, a switch is serially connected to the current-attenuation adjusting resistor.

(10) In (9) mentioned above, auxiliary interconnecting normal conductive lines are connected in such a manner that a circulating current can be passed through each pair of opposing superconducting coils.

(11) In (2) mentioned above, a bidirectional switch that conducts in response to a voltage greater than a prescribed voltage is serially connected to each of the protective resistors, and a bidirectional switch that conducts in response to a voltage greater than a prescribed voltage is serially connected to the interconnecting normal conductive line.

(12) In (1) mentioned above, the protective resistors are connected across the corresponding superconducting coils arranged on one side of the magnetically levitated train, bidirectional switching elements that conduct in response to a voltage greater than a prescribed voltage are serially connected to the protective resistors, auxiliary interconnecting normal conductive lines are provided in such a manner that a circulating current can be passed through each pair of opposing superconducting coils, a protective resistor is provided in each of the auxiliary interconnecting normal conductive lines and a bidirectional switching element that conducts in response to a voltage greater than a prescribed voltage is serially connected to each of these protective resistors.

(13) In (4) mentioned above, a bidirectional switching element that conducts in response to a voltage greater than a prescribed voltage is connected in parallel with each series circuit composed of the protective resistor and diode, a current-attenuation adjusting resistor is connected to the interconnecting normal conductive line, and a bidirectional switching element that conducts in response to a voltage greater than a predetermined voltage is serially connected to the current-attenuation adjusting resistor.

By virtue of the construction of the present invention, as described above, the superconducting coils produce no heat at all owing to a DC current passed through them. However, when the current varies, heat is produced by hysteresis loss and eddy-current loss. If the change in current is slowed down, less heat is produced and, since the superconducting coils are cooled by the surrounding refrigerant, the temperature does not rise high enough to affect the current-carrying capacity. If the change in current is sufficiently rapid, on the other hand, a large amount of heat is produced, the temperature of the superconducting coil rises and this superconducting coil undergoes a normal conductive transition. This is the property of superconducting coils.

The present invention utilizes this peculiar nature of superconducting coils. Specifically, when it is desired to suddenly de-energize a superconducting coil through which a current is flowing in the persistent current mode, the persistent current switch is changed over to the open state so that the current flowing through this superconducting coil is made to commutate to the protective resistor having the sufficiently large resistance value. A normal conductive transition is induced in the superconducting coil within one second by a high-speed current variation, whereby the superconducting coil is de-energized in a short period of time.

In accordance with (1) through (5) mentioned above, if one superconducting coil undergoes a normal conductive transition, the opposing superconducting coil also is made to undergo the normal conductive transition promptly to suppress the generation of an electromagnetic guiding force acting in the lateral direction of the train.

Furthermore, if one persistent current switch is changed over to the open state, only the persistent current switch arranged to oppose it is changed over to the open state promptly so that the superconducting coil will not undergo a normal conductive transition. Accordingly, the generation of an electromagnetic guiding force acting in the lateral direction of the train is suppressed.

No normal conductive transition is induced in an superconducting coil also in a case where a demagnetizer malfunctions so as change over a persistent magnetic switch to the open state.

Furthermore, in accordance with (6), (7) and (9) above, the current-attenuation adjusting resistor provided in the interconnecting normal conductive line makes it possible to adjust the current attenuating time to such an extent that a superconducting coil whose current has been commutated is not allowed to undergo a normal conductive transition.

In accordance with (8) above, a current which flows into the interconnecting normal conductive line connecting the opposing superconducting coils is blocked at the time of energization by the diode provided in the interconnecting normal conductive line. In other words, a useless current does not flow through the interconnecting normal conductive line so that it is possible to avoid an energizing power supply having an excessively large capacity.

In accordance with (10) above, a circulating current can be passed through each pair of superconducting coils. Therefore, if any persistent current switch is in the open state, the superconducting coil is not caused to undergo a normal conductive transition when the another pair of persistent current switches is changed over to the open state.

In accordance with (11) above, when an abnormal voltage is impressed across superconducting coils or persistent current switches, the bidirectional switching elements close automatically so that an abnormal rise in the voltage between the superconducting coils or persistent current switches can be suppressed. Furthermore, since a bidirectional switch is in the open state owing to a voltage produced across a superconducting coil at the time of an energizing or de-energizing operation, no shunt current to the protective resistor is produced. Accordingly, loss due to the shunt current can be eliminated and operating time can be shortened.

Furthermore, in accordance with (12) above, the number of protective resistors can be reduced, space and cost can be reduced and the magnetically levitated train can be made light in weight.

Further, in accordance with (13) above, a bidirectional switching element is connected in parallel with each superconducting coil. As a result, if an abnormal voltage is produced across each superconducting coil, the bidirectional switching elements are discharged so that a current passes through them, thereby making it possible to control the abnormal voltage.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
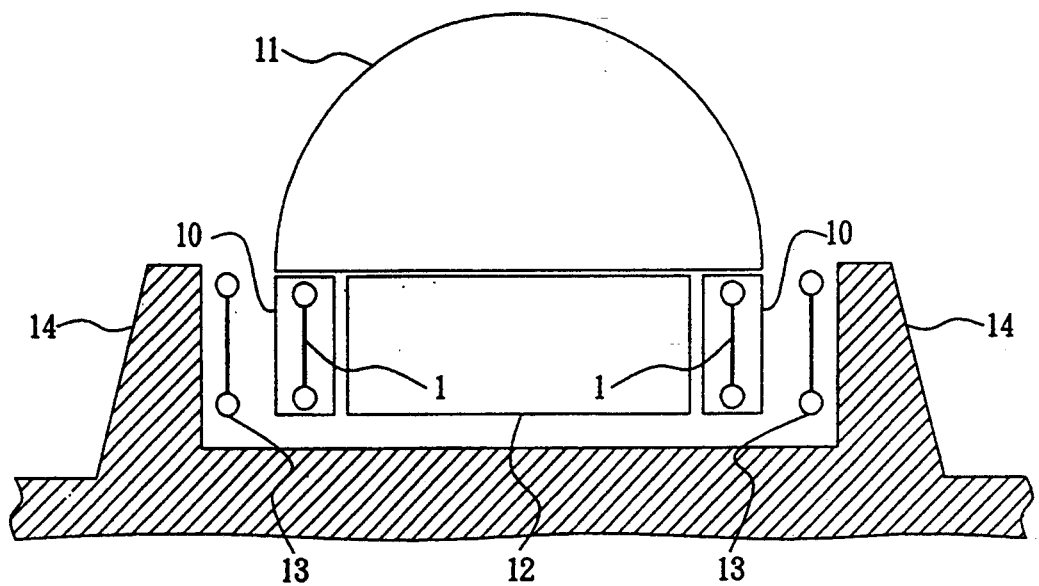
FIG. 1 is a schematic sectional view of a magnetically levitated train according to the prior art.
Figure 3:
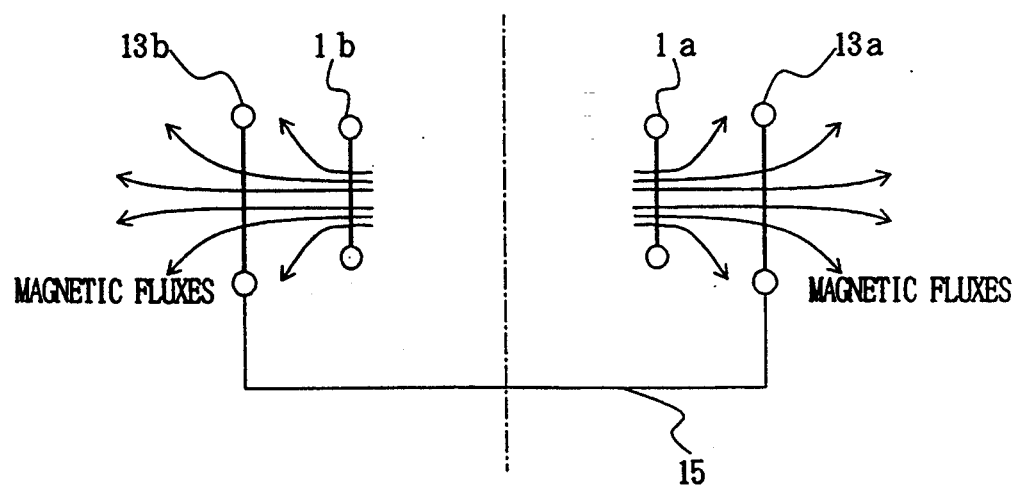
FIG. 3 is a diagram illustrating the positional relationship between superconducting coils and ground coils for guidance, as well as the magnetic flux, which prevails when a magnetically levitated train according to the prior art is running in the vicinity of an equilibrium position owing to a magnetic guiding force.

Preferred embodiments of the present invention will now be described in detail with reference to the drawings.

A first embodiment of the present invention will be described with reference to FIGS. 6 through 9. Portions identical with those in the prior art will be designated by the same reference numerals and need not be described again.

When a superconducting magnet apparatus of a magnetically levitated train is energized and de-energized, usually the superconducting coils $1a \sim 1f$ of the superconducting magnets of the train are connected to the power supply 5 via the disconnectors 6 within the vehicle so that the energizing and de-energizing operations may be performed.

Figure 6:
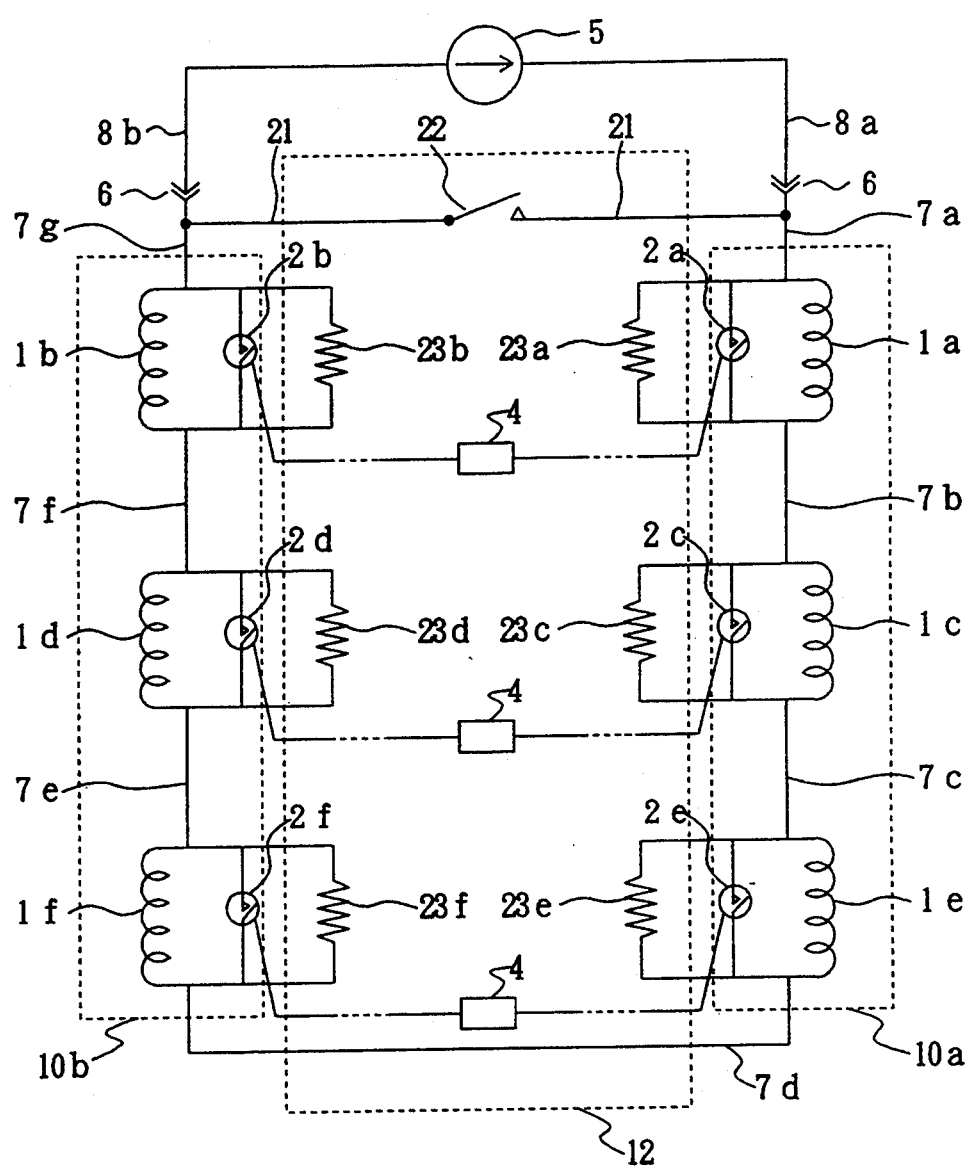
FIG. 6 is a circuit diagram showing a superconducting magnet apparatus for a magnetically levitated train illustrating a first embodiment of the present invention.

More specifically, in a case where the superconducting magnets are energized, the power supply 5 is made to pass a current via the power-supply cables $8a$, $8b$, the disconnectors 6 and the current lead wires $7a \sim 7g$ in a state in which the persistent current switches $2a \sim 2f$ are open, as illustrated in FIG. 6. The persistent current switches $2a \sim 2f$ are closed after a prescribed current flows through the superconducting coils $1a \sim 1f$. As a result, after the power supply 5 is disconnected, the current of the superconducting coils $1a \sim 1f$ flows in the persistent current mode so that a current continues to flow internally to maintain a strong magnetic force.

In a case where the superconducting magnets are de-energized, on the other hand, the power supply 5 starts to pass a current, in a state in which the persistent current switches $2a \sim 2f$ are closed, to the superconducting coils $1a \sim 1f$ operating in the persistent current mode. After the current rises to the value of the current flowing through the superconducting coils $1a \sim 1f$, the persistent current switches $2a \sim 2f$ are opened so that the current falls to zero amperes. As a result, the strong magnetic force of the superconducting coil $1a \sim 1f$ vanishes.

In the case of such energization and de-energization of the superconducting magnetic apparatus, an interconnecting normal conductive line 21 is opened via a switch 22. Instead of the switch 22, an arrangement may be adopted in which connecting portions are provided on both ends of the interconnecting normal conductive line 21 so that the interconnecting normal conductive line 21 may be freely attached to and detached from the current lead wires 7a~7g. More specifically, the interconnecting normal conductive line 21 is opened when the superconducting coils are energized and de-energized.

By virtue of this arrangement, a circulating circuit in which the superconducting coils 1a~1f are serially connected is formed when the magnetically levitated train is running. That is, a closed circuit is constructed by the current lead wire 7a, superconducting coil 1a, current lead wire 7b, superconducting coil 1c, current lead wire 7c, superconducting coil 1e, current lead wire 7d, superconducting coil 1f, current lead wire 7c, superconducting coil 7f, current lead wire 7e, superconducting coil 1d, current lead wire 7f, superconducting coil 1b, current lead wire 7g and interconnecting normal conductive line 21.

The closed circuit using the interconnecting normal conductive line 21 does not perform any particular function if the superconducting coils 1a~1f are operating normally. When a superconducting coil is quenched, i.e., when an abnormality occurs in which a superconducting coil undergoes a normal conductive transition, the closed circuit using the interconnecting normal conductive line 21 causes the superconducting coil opposing the superconducting coil that has undergone the normal conductive transition to also rapidly undergo the normal conductive transition, thereby suppressing the occurrence of an electromagnetic guiding force acting laterally of the train.

Further, in a case where a persistent current switch malfunctions, current is attenuated gently without causing the superconducting coil to undergo the normal conductive transition. In addition, since the magnetic fields produced by the left and right superconducting magnets are symmetrical, an abnormal electromagnetic repulsive force is not produced in the lateral direction.

Accordingly, the resistance value of each of the protective resistors 23a~23f is made a resistance value of a size that will cause the superconducting coils 1a~1f to undergo a normal conductive transition when the currents of the superconducting coils 1a~1f are commutated to these protective resistors from the persistent current switches 2a~2f. More specifically, the resistance value is set to be larger than $0.07\Omega$, which is the resistance value of the protective resistors 3a~3f of the prior art. For example, the resistance value is set to $0.6\Omega$.

One superconducting magnet 10a is attached to one side of the truck 12 and one superconducting magnet 10b is attached to the other side of the truck 12. The superconducting coils 1a, 1c, 1e are serially connected to the superconducting magnet 10a, and the superconducting coils 1b, 1d, 1f are serially connected to the superconducting magnet 10b.

The persistent current switch 2a and protective resistor 23a form a closed circuit with the superconducting coil 1a; the persistent current switch 2c and protective resistor 23c form a closed circuit with the superconducting coil 1c; the persistent current switch 2e and protective resistor 23e form a closed circuit with the superconducting coil 1e; the persistent current switch 2b and protective resistor 23b form a closed circuit with the superconducting coil 1b; the persistent current switch 2d and protective resistor 23d form a closed circuit with the superconducting coil 1d; and the persistent current switch 2f and protective resistor 23f form a closed circuit with the superconducting coil 1f.

The superconducting coils 1a~1f each have a self-inductance of about 2.7 H and an electrical resistance of zero at the time of normal operation. When a superconducting coil undergoes a normal conductive transition, however, the superconducting coil becomes a resistor having a resistance value of several ohms. The persistent current switches 2a~2f are thermal-type persistent current switches having zero electrical resistance in the closed state and an electrical resistance of about $50\Omega$ in the open state, which is when the switches attain the resistive state.

The protective resistors 23a~23f are provided with as large a resistance value as possible within a range that will not give rise to electrical discharge by the generation of a voltage when a 600 A current of the superconducting coils 1a~1f is commutated. In this embodiment, the magnitude of the protective resistors 23a~23f is set to, say, $0.6\Omega$, namely a resistance value that is approximately nine times that of the conventional protective resistors.

Figure 2:
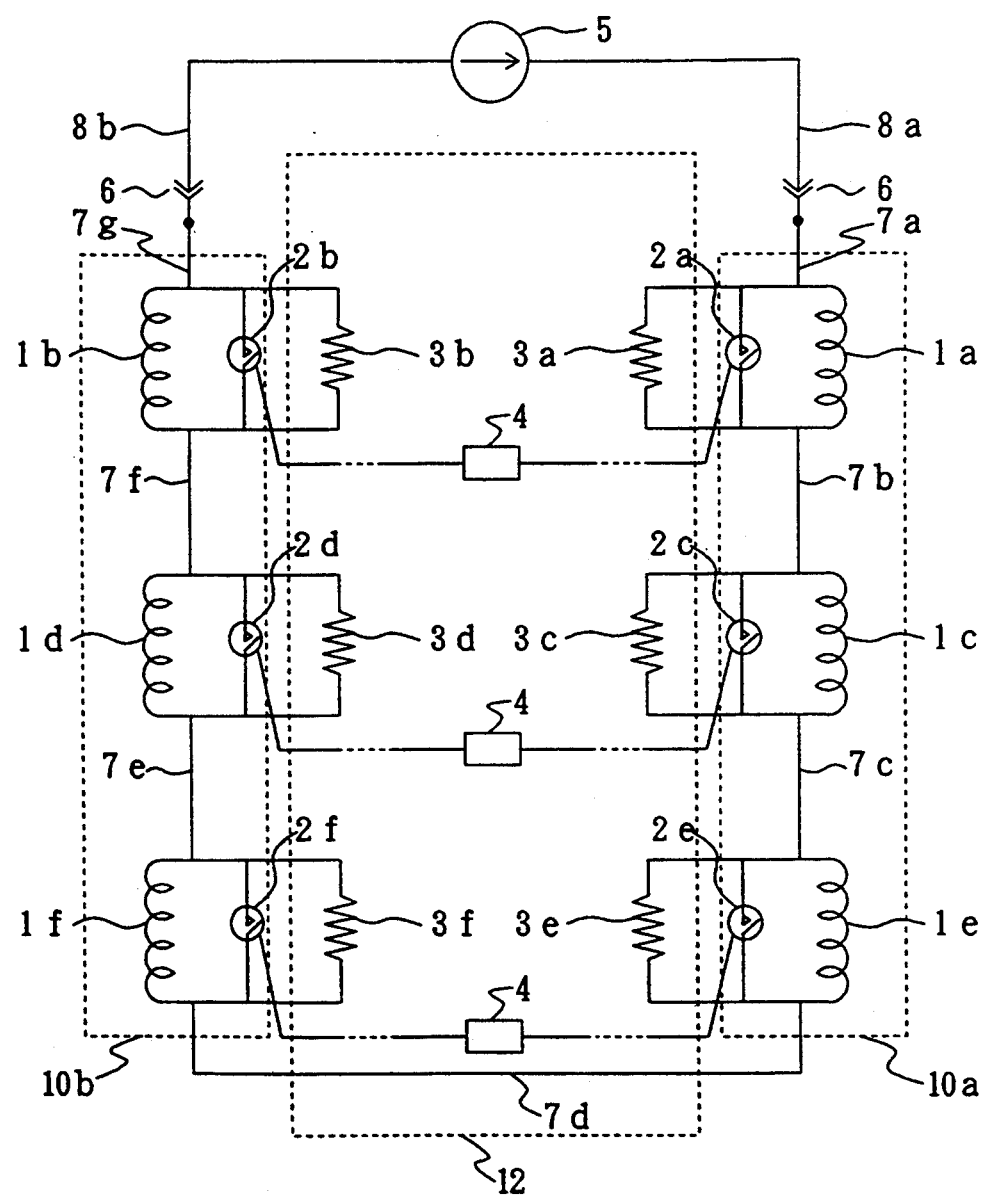
FIG. 2 is a circuit diagram showing a superconducting magnet apparatus for a magnetically levitated train according to the prior art.
Figure 4:
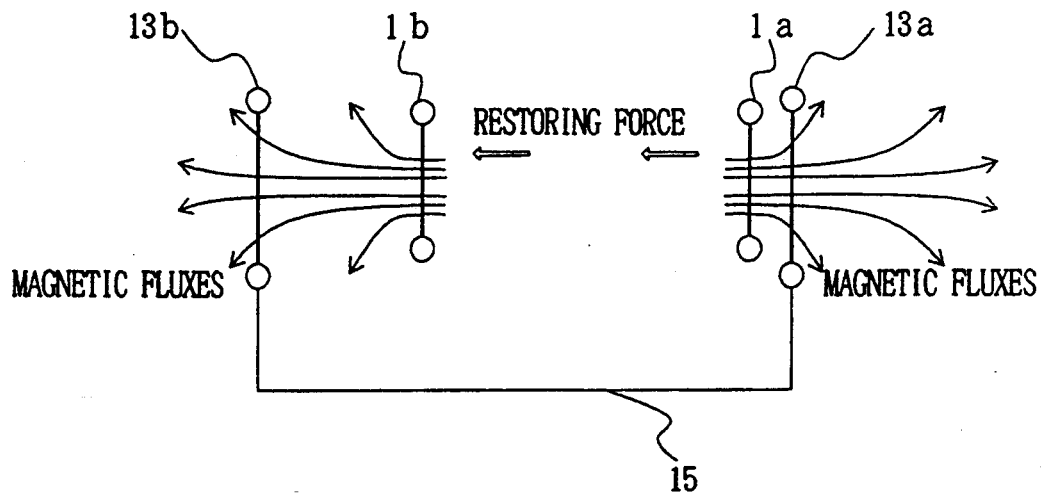
FIG. 4 is a diagram illustrating the positional relationship between superconducting coils and ground coils for guidance, as well as the magnetic flux, which prevails when a magnetically levitated train according to the prior art is running while undergoing a displacement in the horizontal direction from the equilibrium position.
Figure 5:
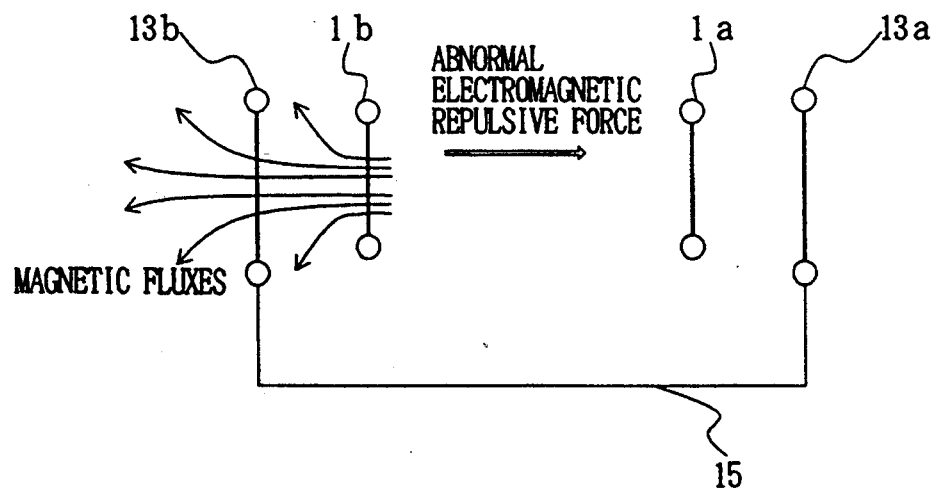
FIG. 5 is a diagram illustrating the positional relationship between the superconducting coils and the ground coils for guidance, as well as the magnetic flux, which prevails when the superconducting coil on one side of a magnetically levitated train according to the prior art undergoes a normal conductive transition.
Figure 7:
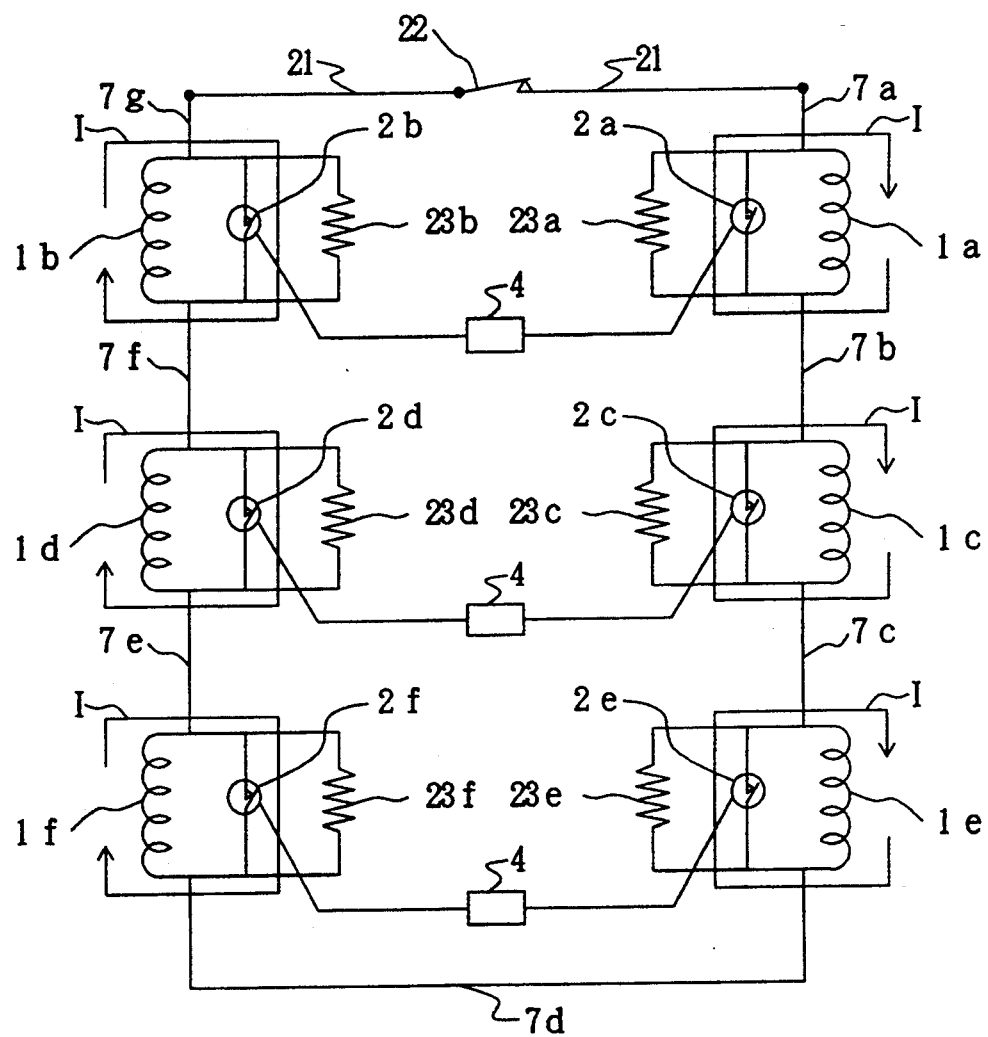
FIG. 7 is a circuit diagram of a circuit through which a current flows at the time of normal operation of a superconducting magnet apparatus for a magnetically levitated train illustrating a first embodiment of the present invention.

Accordingly, when the vehicle is running normally, a current I of about 600 A flows continuously, as indicated by the solid-line arrows in FIG. 7, through each of the superconducting coils 1a~1f and persistent current switches 2a~2f, the resistance of each of which is zero. It should be noted that the power supply and disconnectors of FIG. 2 are not shown in FIG. 7.

Figure 8:
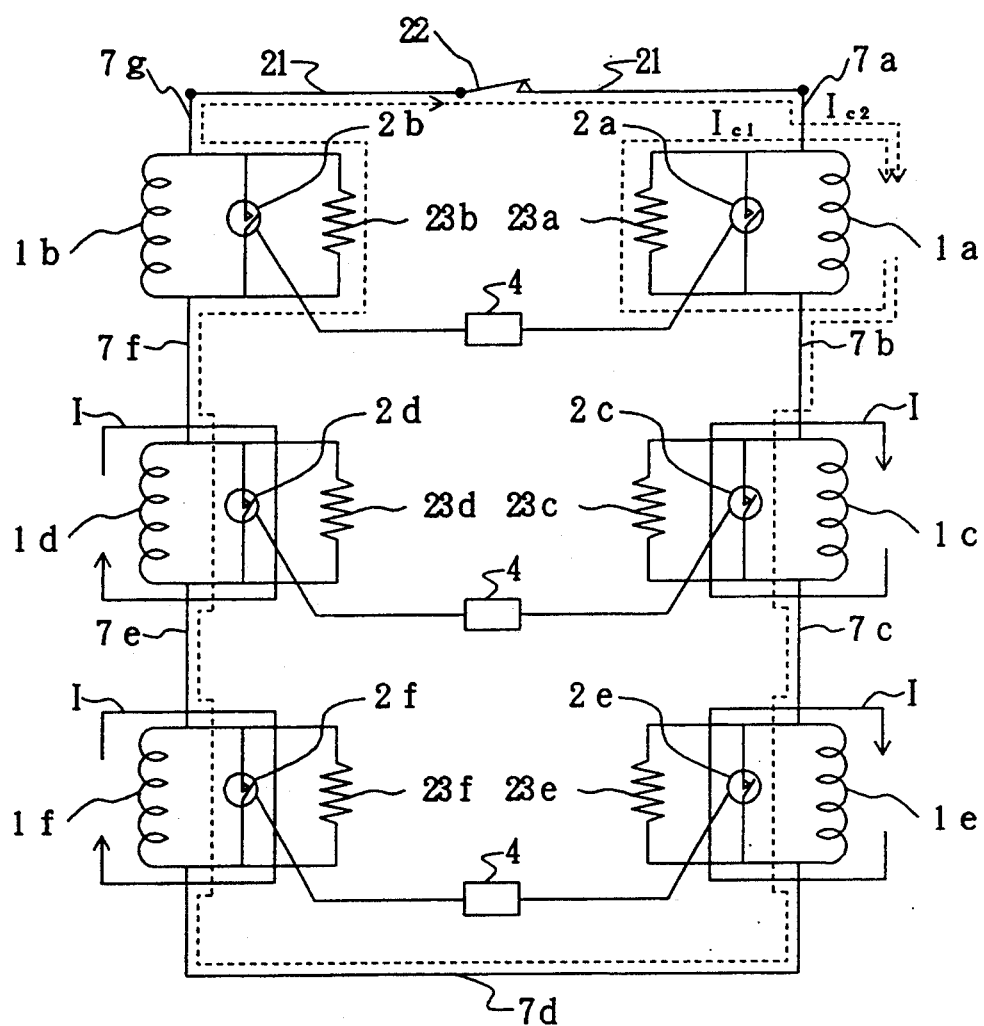
FIG. 8 is a circuit diagram showing currents that flow when a superconducting coil undergoes a normal conductive transition in a superconducting magnet apparatus for a magnetically levitated train illustrating the first embodiment of the present invention.

A case in which a superconducting coil undergoes a normal conductive transition will now be described with reference to FIG. 8.

If, say, the superconducting coil 1b undergoes a normal conductive transition because of some disturbance, the superconducting coil 1b assumes a resistive state of several ohms in several hundred milliseconds so that the current is converted to thermal energy by the coil and vanishes. According to the results of actual measurement, the current vanishes in a time of about two seconds. Further, at approximately the same time as the occurrence of the normal conductive transition, the persistent current switch 2b of the superconducting coil 1b which first underwent the normal conductive transition and the persistent current switch 2a of the opposing superconducting coil 1a are changed over to the open state by the demagnetizer 4. When the persistent current switch 2a is changed over to the open state, the current of the superconducting coil 1a approximates the sum of a current $I_{c1}$ that flows through the circuit via the protective resistor 23a and a current $I_{c2}$ that flows through the circuit via the protective resistor 23b, as indicated by the arrows composed of the dashed lines in FIG. 8.

It should be noted that although a slight current flows through the superconducting coil 1b, which has undergone the normal conductive transition, as well as through the persistent current switch 2b or 2a that has been changed over to the open state, these resistance values are large in comparison with the protective resistors 23a, 23b and therefore the currents are negligible in comparison with the currents that flow through the protective resistors. As for the current of the superconducting coil 1a at this time, an attenuation time constant $\tau = L/R = 9$ sec is decided by the fact that the self-inductance L of the superconducting coil 1a is 2.7 H and the combined resistance R across the superconducting coil is $0.6/2 = 0.3\Omega$.

According to the results of experiments using the 5 superconducting coils of this embodiment, when the attenuation time constant is 9 sec, the normal conductive transition occurs approximately 0.5 sec after the current is commutated to the protective resistor. If a protective resistor is given a resistance value other than that of this embodiment so that the attenuation time constant is made less than 9 sec, then the superconducting coil for the magnetically levitated train will undergo the normal conductive transition. In conclusion, therefore, the superconducting coil 1a will also undergo the normal conductive transition immediately after the superconducting coil 1b does, and the magnetic field distribution produced by the left and right superconducting coil magnets is rendered symmetrical so that an abnormal electromagnetic repulsive force will be produced.

It should be noted that even if the superconducting coil that first undergoes the normal conductive transition is any of the superconducting coils 1a, 1c~1f instead of the superconducting coil 1b, the opposing superconducting coil also can be made to undergo the normal conductive transition by the same principle as that described above.

Figure 9:
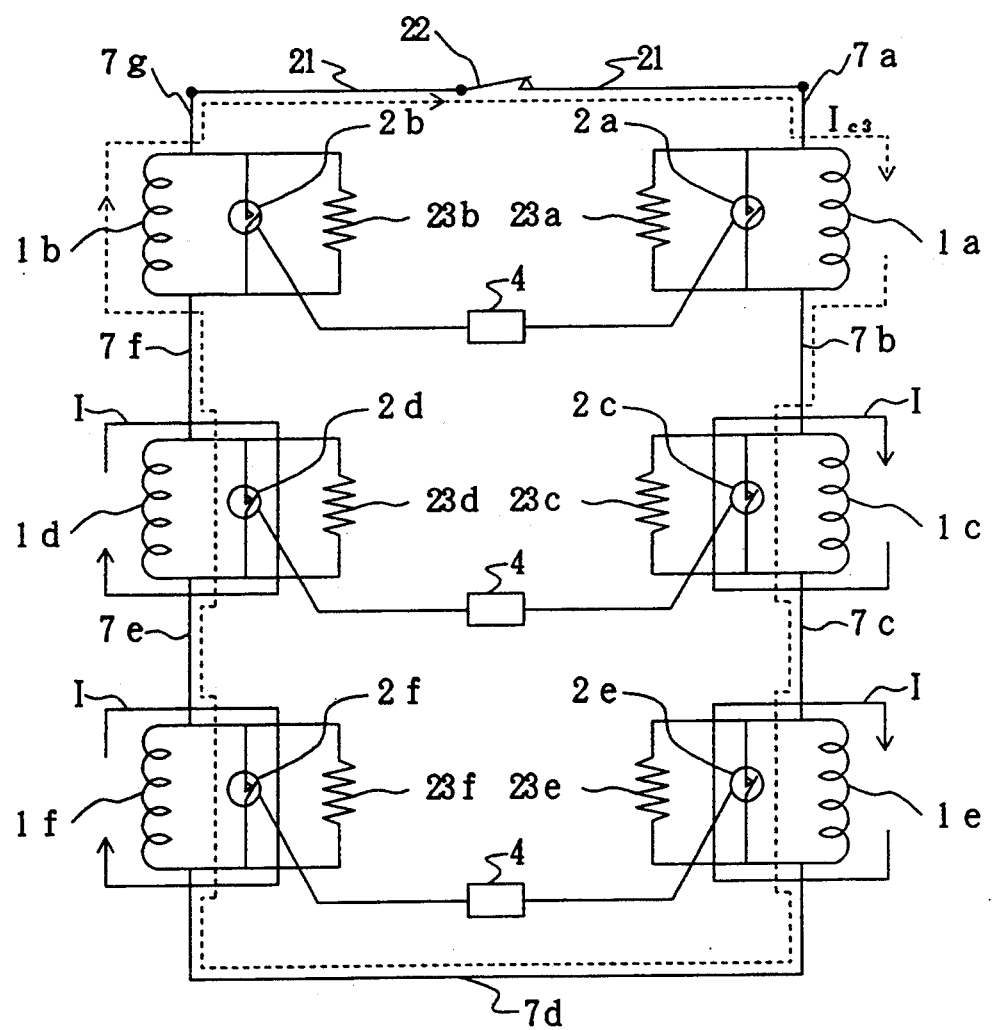
FIG. 9 is a circuit diagram showing a current that flows when a persistent current switch is changed over to the open state for some reason in a superconducting magnet apparatus for a magnetically levitated train illustrating the first embodiment of the present invention.

Next, a case in which a persistent current switch is changed over to the open state for some reason will be described with reference to FIG. 9.

If, say, the persistent current switch 2b is changed over to the open state by some disturbance, the demagnetizer 4 heats the heater of the opposing persistent current switch 2a so that the switch 2a is changed over to the open state. At this time the heater of the persistent current switch 2b also is heated simultaneously. However, no problems arise since this switch has already been changed over to the open state. When the persistent current switches 2a, 2b are thus changed over to the open state, a current $I_{c3}$ of the superconducting coils 1a and 1b flows through the path indicated by the arrows composed of the dashed lines in FIG. 9. Since the interconnecting normal conductive line 21 interconnecting the left and right superconducting magnets and the current lead wires 7a~7g have small resistance values, the attenuation of the current takes place slowly.

On the basis of experiments using the superconducting coils of this embodiment, it has been confirmed that the normal conductive transition will not occur if the attenuation time constant is greater than at least 27 sec.

Accordingly, in the case of the superconducting magnet apparatus of this embodiment, the superconducting coils 1a and 1b form a series circuit and attenuate current in substantially the same manner so that the magnetic fields produced by the left and right superconducting magnets are rendered symmetrical. As a result, an abnormal electromagnetic repulsive force is not produced in the lateral direction.

Further, the resistance for making the attenuation time constant of the superconducting coils 1a and 1b greater than 27 sec is $0.2\Omega$. However, since the resistance of the interconnecting normal conductive line 21 and current lead wires 7a~7g can be made sufficiently smaller than this resistance of $0.2\Omega$, the superconducting coils 1a and 1b will not undergo the normal conductive transition. In conclusion, therefore, in response to changeover of a persistent current switch to the open state, the opposing persistent current switch also changes over to the open state. However, the normal conductive transition of the superconducting coil does not occur and the current is attenuated in a slow manner.

Accordingly, it is possible to avoid loss of liquid helium by evaporation that accompanies the normal conductive transition of a superconducting coil.

Further, since the attenuation of current is slow, the train can be stopped safely by electrical braking while current remains.

The initial changeover of a persistent current switch to the open state may occur in any of the persistent current switches besides the persistent current switch 2b. Regardless of the persistent current switch changed over to the open state, the opposing persistent current switch will also be changed over to the open state by the above-described principle so that the normal conductive transition will not be induced in the superconducting coils.

In a case where the de-energizing operation malfunctions, the output of the demagnetizer will change over the opposing persistent current switches to the open state at the same time. For example, if the demagnetizer 4 of FIG. 6 has changed over the persistent current switches 2a and 2b to the open state, the current of the superconducting coils 1a and 1b flows through the path of the dashed-line arrows in FIG. 9 in the same manner as when the persistent current switches 2a and 2b were changed over to the open state.

In the end, therefore, a malfunction in the demagnetizer 4 leads to an operation similar to that performed when a persistent current switch is initially changed over to the open state for some reason.

Accordingly, the superconducting coils 1a, 1b will not undergo the normal conductive transition and needless loss of liquid helium through evaporation is prevented. In addition, an abnormal electromagnetic repulsive force is not produced. It should be noted that the changeover to the open state of the persistent current switches owing to a malfunction in the demagnetizer 4 may occur in any set or plurality of sets of left and right persistent current switches besides the set of persistent current switches 2a and 2b. Nevertheless, the current of the superconducting coils will flow through the interconnecting normal conductive line 21 and the current lead wires 7a~7g so as to be gently attenuated without the occurrence of the normal conductive transition.

A second embodiment of the present invention will now be described with reference to FIGS. 10 through 12.

Figure 10:
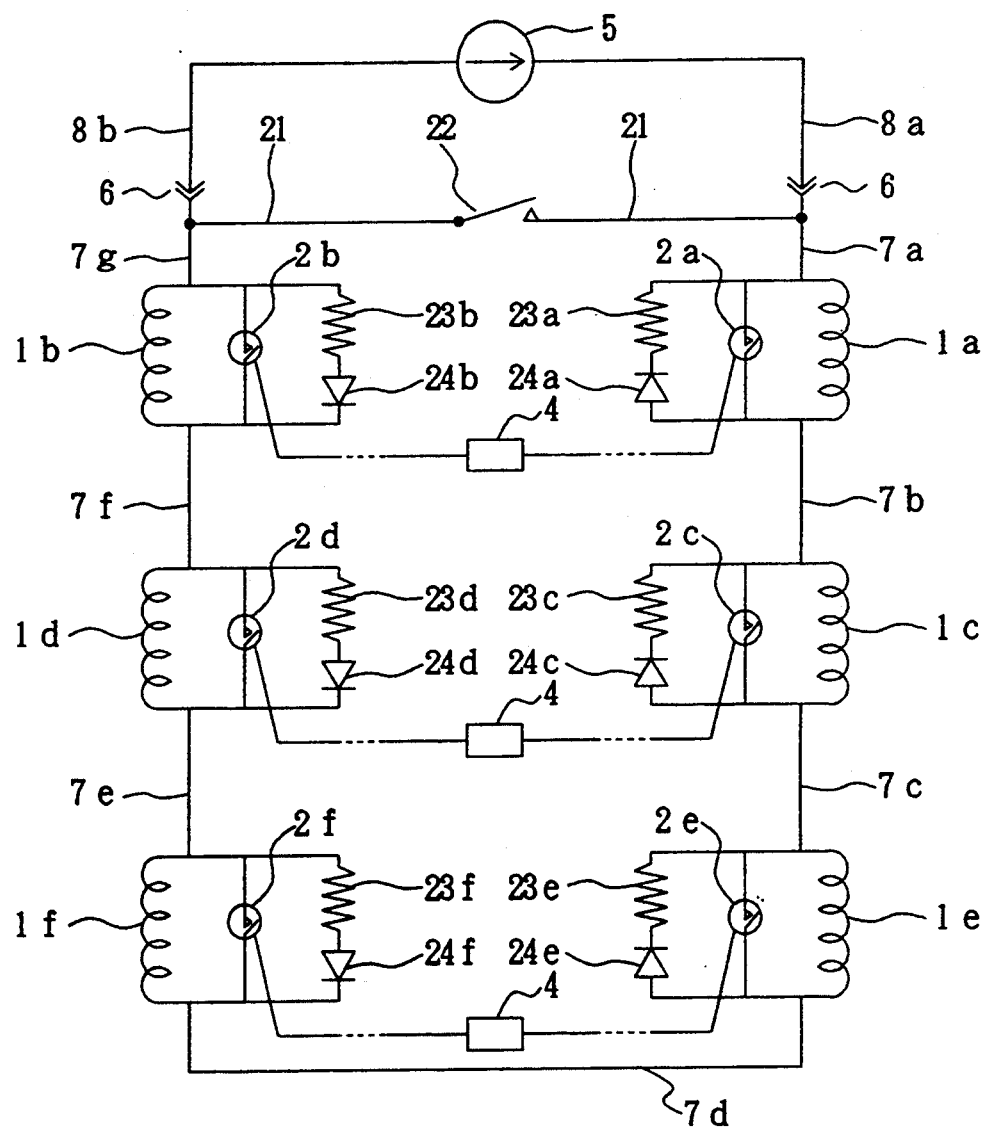
FIG. 10 a circuit diagram of a superconducting magnet apparatus for a magnetically levitated train illustrating a second embodiment of the present invention.

In this embodiment, as shown in FIG. 10, the arrangement of the first embodiment is additionally provided with diodes 24a~24f connected in series with respective ones of the protective resistors. The diodes 24a~24f are connected in such a direction that they will pass only the current produced by the superconducting coil to which the corresponding protective resistor is serially connected. That is, the diodes 24a~24f are connected in series with the corresponding protective resistors 23a~23f, and the polarity of each diode is such that the diode is connected in the forward direction with respect to the current of the corresponding superconducting coil.

Figure 11:
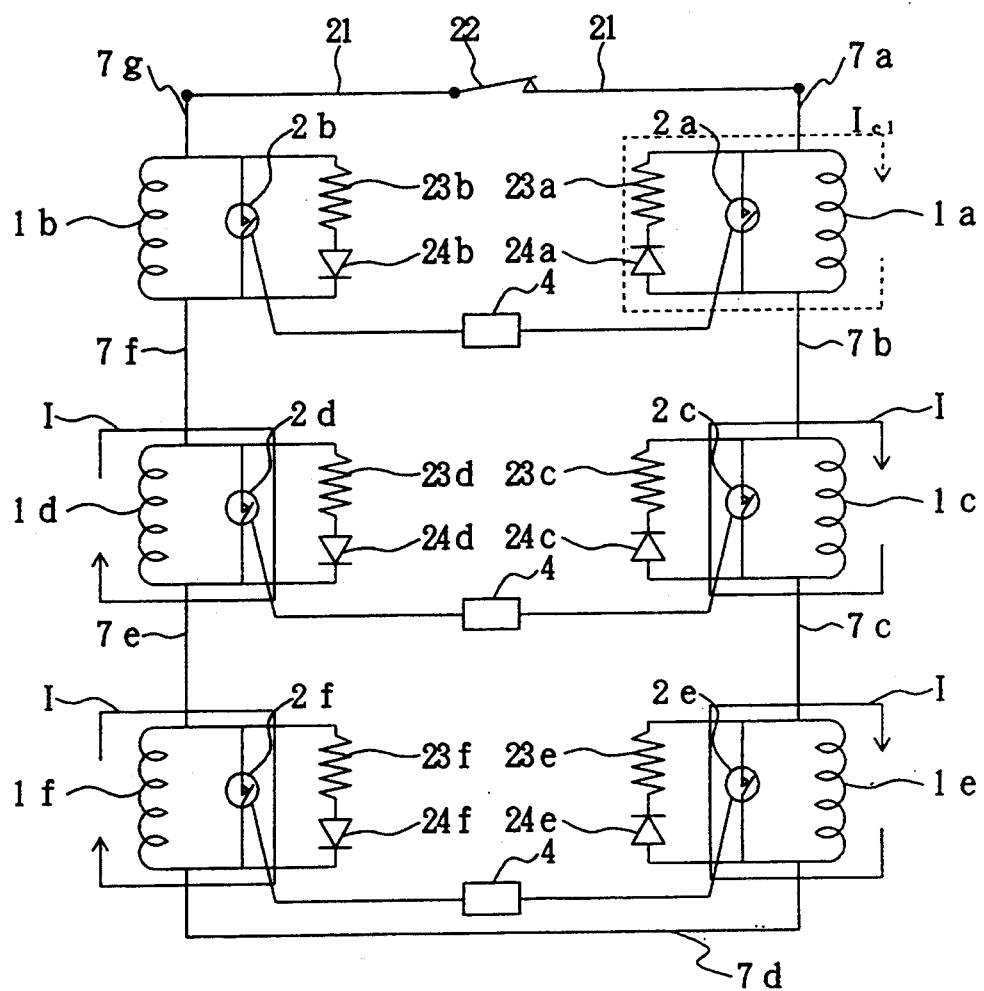
FIG. 11 is a circuit diagram showing a current that flows when a superconducting coil undergoes a normal conductive transition in a superconducting magnet apparatus for a magnetically levitated train illustrating the second embodiment of the present invention.
Figure 12:
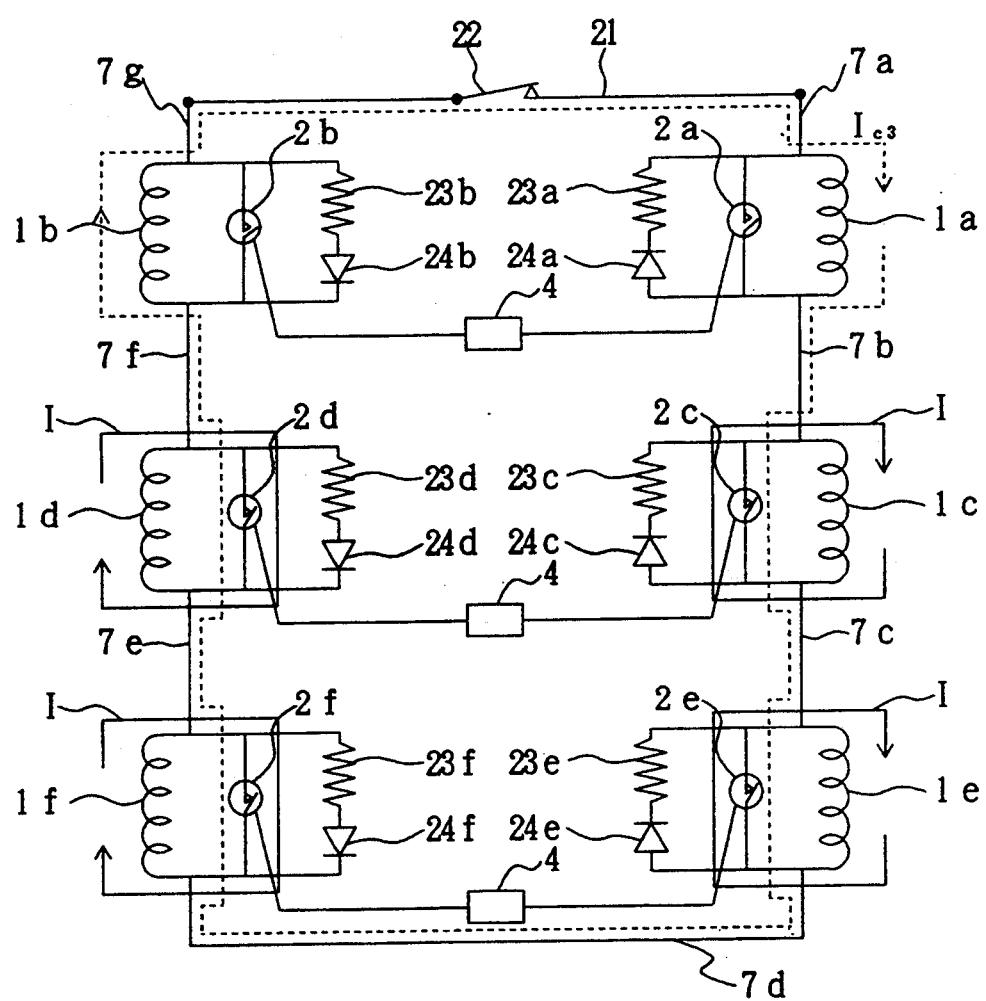
FIG. 12 is a circuit diagram showing a current that flows when a persistent current switch is changed over to the open state for some reason in a superconducting magnet apparatus for a magnetically levitated train illustrating the second embodiment of the present invention.

According to this embodiment, when, say, the superconducting coil 1b undergoes the normal conductive transition so that the demagnetizer 4 changes over the persistent current switch 2a of the opposing superconducting coil 1a to the open state, as shown in FIG. 11, the flow of current from the superconducting coil 1a into the protective resistor 23b is blocked by the diode 24b so that the current $I_{c1}$ of the superconducting coil 1a flows solely through the protective resistor 23a.

As a result, the resistance connected across the superconducting coil 1a essentially becomes solely the protective resistor 23a, namely 0.6Ω. By contrast, in the case of the first embodiment, the combined resistance based upon the parallel circuit of the protective resistors 23a and 23b is 0.3Ω. Therefore, the resistance value is doubled so that the current attenuation is enlarged and the normal conductive transition of the superconducting coil is capable of taking place more rapidly.

In other words, in the second embodiment, a current attenuation similar to that of the first embodiment can be obtained even if the resistance value of the protective resistors is halved in size. If the fed current is the same, the resistance value and mass will be approximately proportionally related. From this point of view, the mass of the protective resistors of the first embodiment can be reduced by half in the second embodiment, thus making it possible to achieve a more light-weight magnetically levitated train.

Next, a case in which a persistent current switch is changed over to the open state for some reason will be described with reference to FIG. 12.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, the current $I_{c3}$ of the superconducting coils 1a and 1b flows through the path indicated by the arrows composed of the dashed lines in FIG. 12. Since the interconnecting normal conductive line 21 interconnecting the left and right superconducting magnets and the current lead wires 7a~7g have small resistance values, the attenuation of the current takes place slowly.

According to obtained experimental results, when the current attenuation time constant $\tau = L/R$ of the superconducting coils is less than 9 sec, the normal conductive transition occurs, where the self-inductance L of the superconducting coils in the first and second embodiments is 2.7 H and the value of the resistance connected to each superconducting coil is essentially the resistance value R of the protective resistor.

Accordingly, if $9 \geq L/R$ holds, the normal conductive transition will occur and the superconducting coil will be de-energized when the current of the superconducting coil is commutated to the protective resistor.

A third embodiment of the present invention will now be described with reference to FIGS. 13 through 15.

Figure 13:
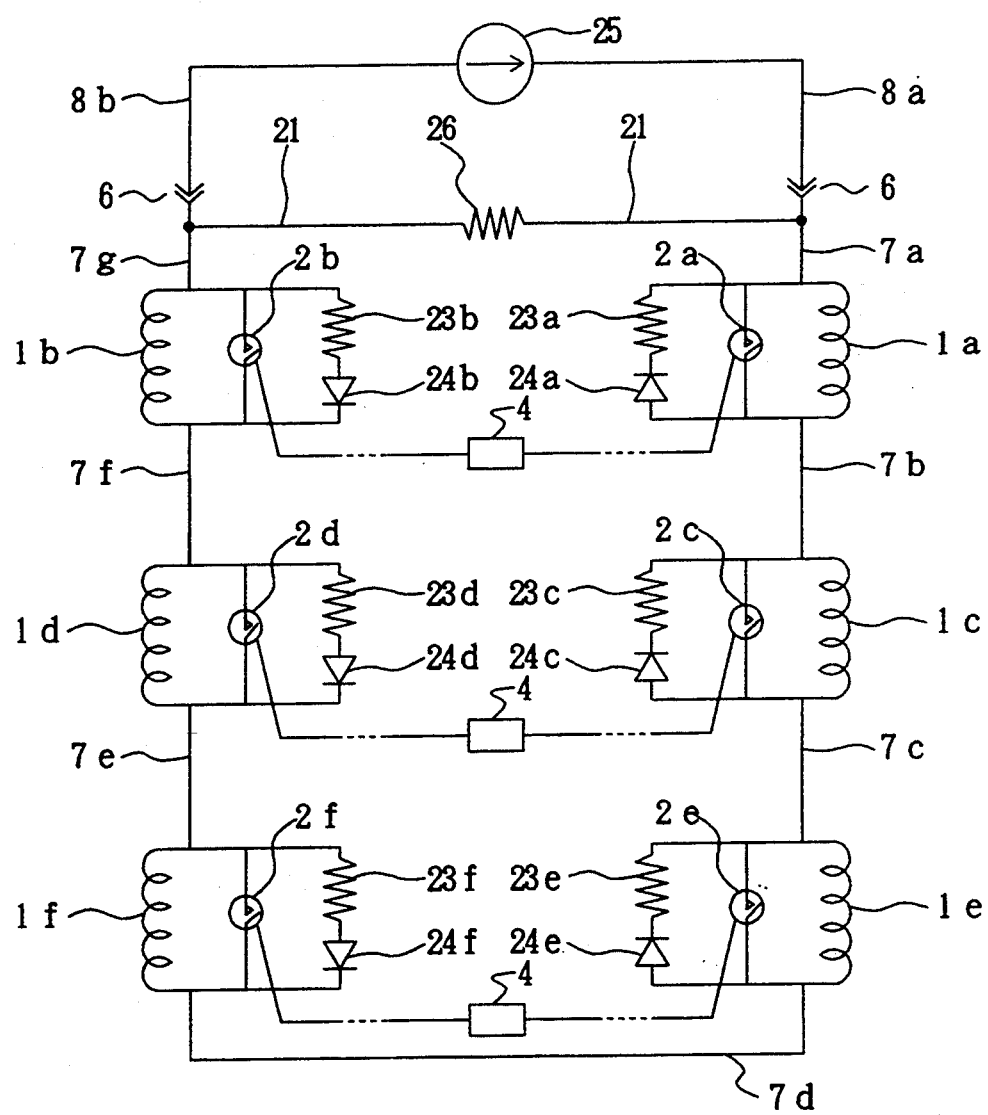
FIG. 13 a circuit diagram of a superconducting magnet apparatus for a magnetically levitated train illustrating a third embodiment of the present invention.
Figure 14:
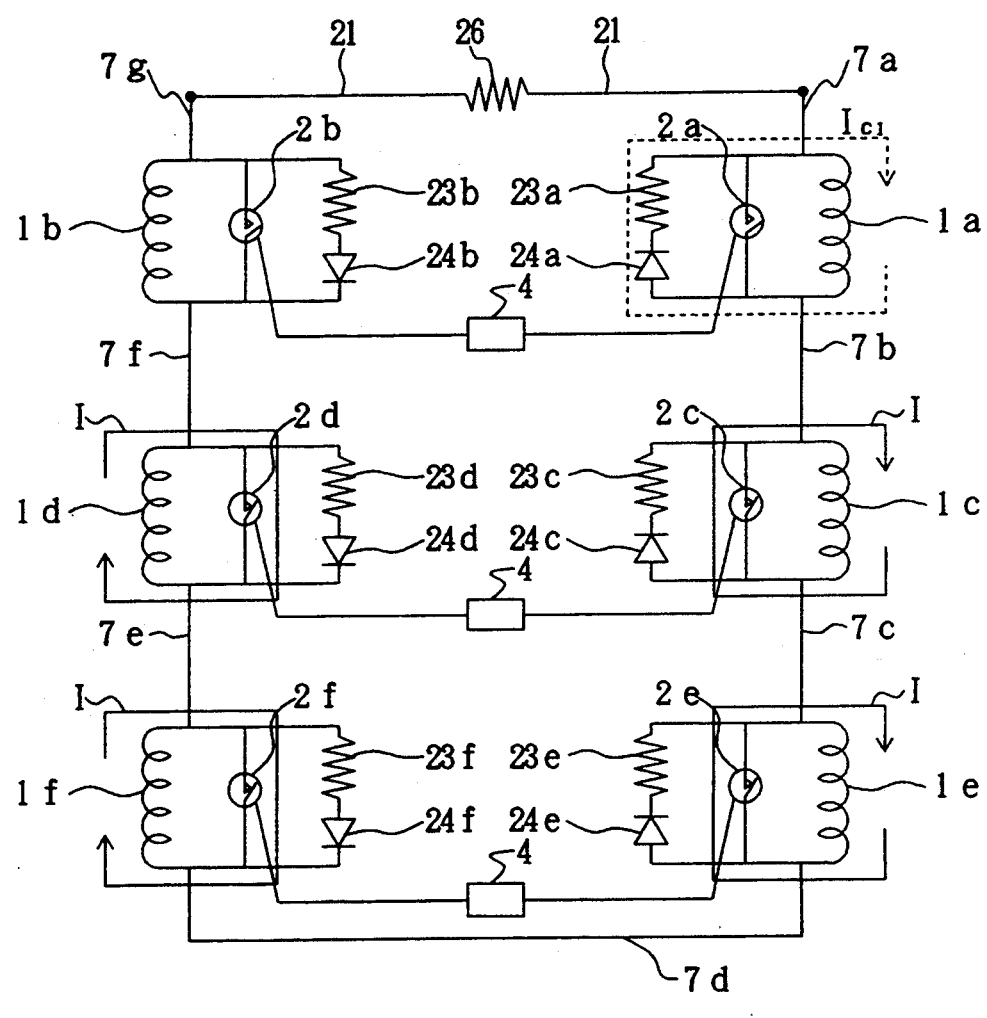
FIG. 14 is a circuit diagram showing a current that flows when a superconducting coil undergoes a normal conductive transition in a superconducting magnet apparatus for a magnetically levitated train illustrating the third embodiment of the present invention.
Figure 15:
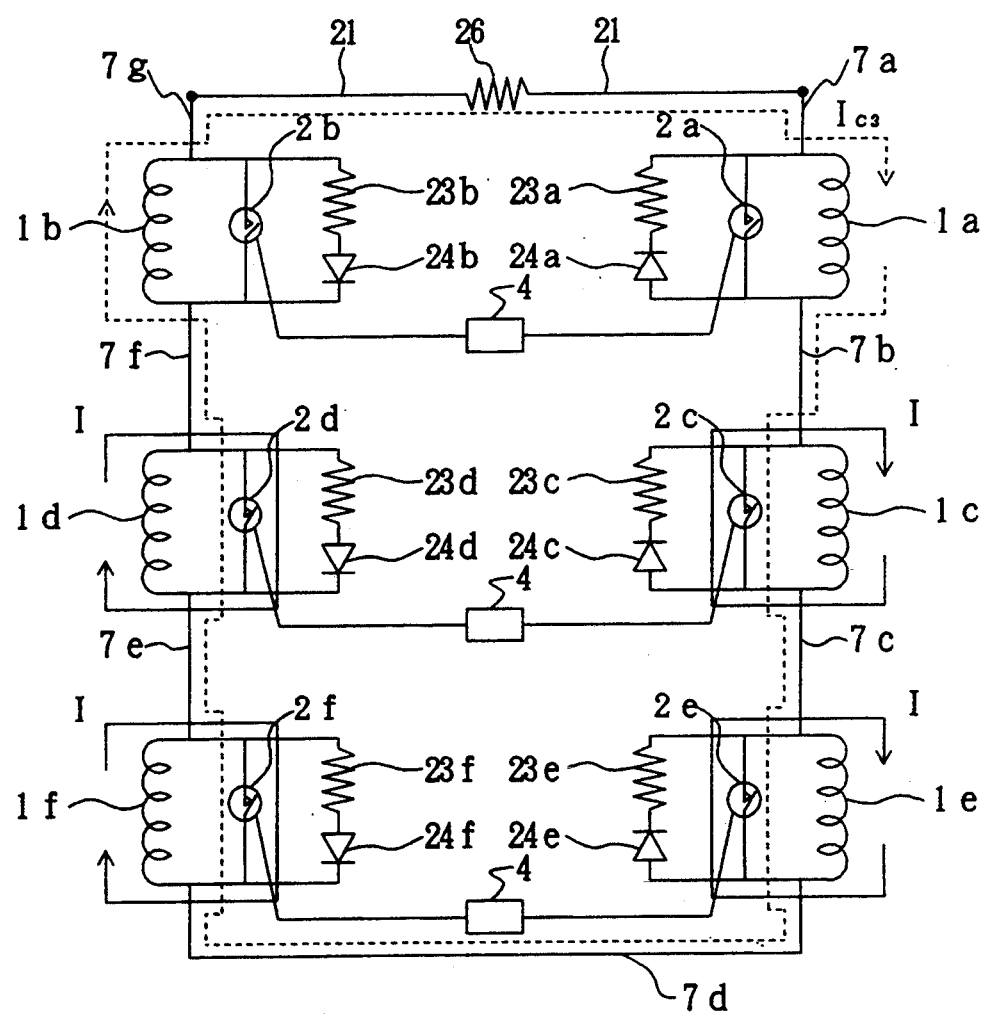
FIG. 15 is a circuit diagram showing a current that flows when a persistent current switch is changed over to the open state for some reason in a superconducting magnet apparatus for a magnetically levitated train illustrating the third embodiment of the present invention.

In this embodiment, as shown in FIGS. 13 through 15, the interconnecting normal conductive line 21 is provided with a current-attenuation adjusting resistor 26 instead of the switch 22 of the first embodiment, and, as in the second embodiment, the diodes 24a~24f are connected in series with respective ones of the protective resistors in such a direction that they will pass only the current produced by the superconducting coil to which the corresponding protective resistor is serially connected. That is, the diodes 24a~24f are connected in series with the corresponding protective resistors 23a~23f, and the polarity of each diode is such that the diode is connected in the forward direction with respect to the current of the corresponding superconducting coil.

According to this embodiment, when, say, the superconducting coil 1b undergoes the normal conductive transition so that the demagnetizer 4 changes over the persistent current switch 2a of the opposing superconducting coil 1a to the open state, as shown in FIG. 14, the flow of the current from the superconducting coil 1a into the protective resistor 23b is blocked by the diode 24b so that the current $I_{c1}$ of the superconducting coil 1a flows solely through the protective resistor 23a.

Next, a case in which a persistent current switch is changed over to the open state for some reason will be described with reference to FIG. 15.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, the current $I_{c3}$ of the superconducting coils 1b and 1a flows through the path indicated by the arrows composed of the dashed lines in FIG. 15. Since the current-attenuation adjusting resistor 26, the interconnecting normal conductive line 21 interconnecting the left and right superconducting magnets and the current lead wires 7a~7g have small resistance values, the attenuation of the current takes place slowly.

In other words, the current-attenuation adjusting resistor 26 is given a resistance value for producing a gentle attenuation of current that will not cause the normal conductive transition to occur if a persistent current switch is changed over to the open state.

According to experimental results obtained with a superconducting coil for a magnetically levitated railway according to this embodiment, when the current attenuation time constant $\tau$ satisfies the relation $\tau \geq L/r \geq 19$ sec, the normal conductive transition does not occur, where the self-inductance L is 1.9 H and the resistance value of the current-attenuation adjusting resistor is r.

More specifically, if a current-attenuation adjusting resistor having a resistance value r of 0.1Ω is connected in the interconnecting normal conductive line 21, the attenuation time constant will be 19 sec and the normal conductive transition will not occur.

Further, according to this embodiment, the power supply 25 can be energized and de-energized without opening the interconnecting normal conductive line 21 interconnecting the left and right superconducting magnets, as shown in FIG. 13.

It should be noted that when the superconducting coils are energized and de-energized upon connecting the power supply 25, it is necessary to reduce loss, which results from a shunt current to the current-attenuation adjusting resistor 26, by gradually changing the supply current from the power supply 25, i.e., by feeding current in such a manner that the change (dI/dt) in the supply current becomes small.

Furthermore, since the conducting time of the interconnecting normal conductive line 21 interconnecting the left and right superconducting magnets becomes shorter in comparison with the arrangement in which the current-attenuation adjusting resistor 26 is not connected, the diameter of the interconnecting normal conductive line 21 can be made smaller. In other words, the amount of conductor is reduced. As a result, it is possible to achieve a magnetically levitated train of lighter weight.

A fourth embodiment of the present invention will now be described with reference to FIGS. 16 through 18.

Figure 16:
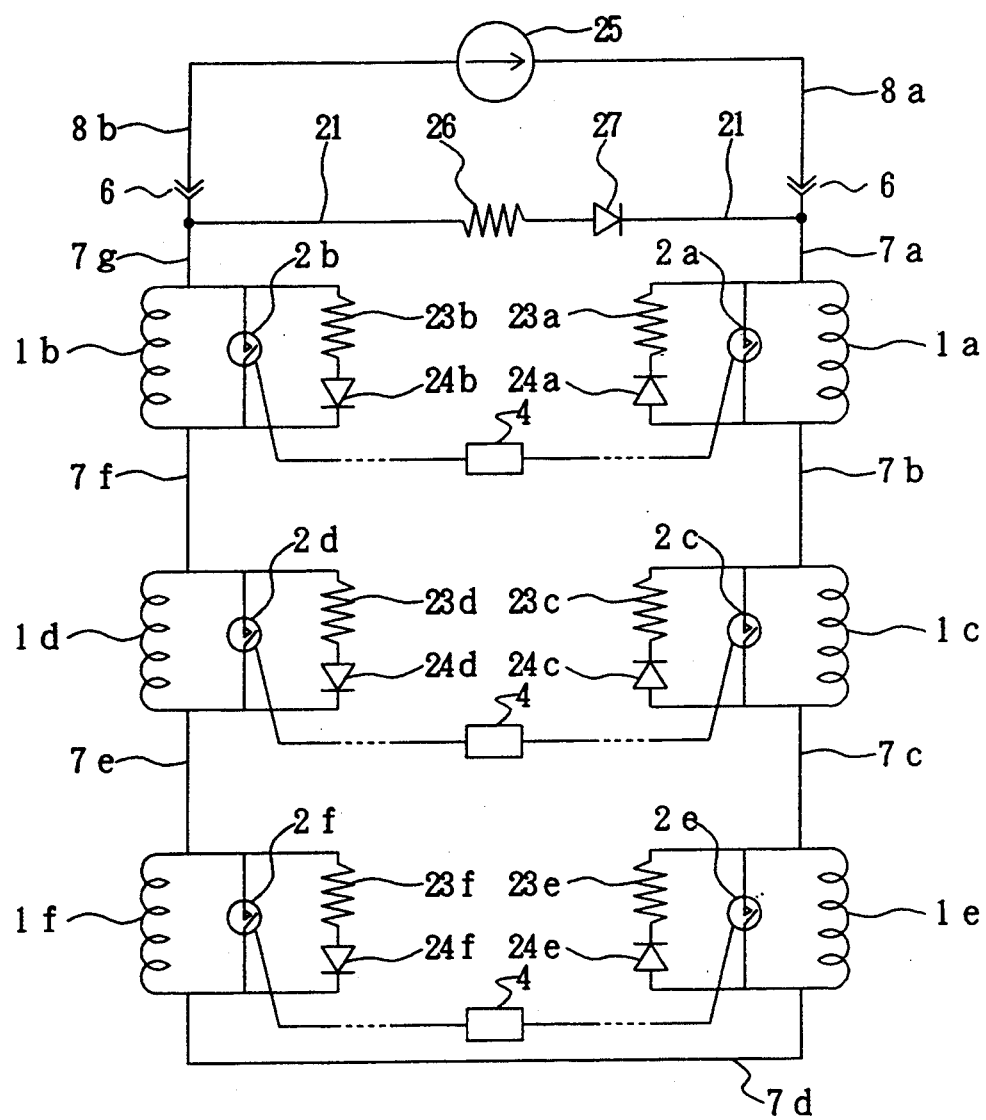
FIG. 16 a circuit diagram of a superconducting magnet apparatus for a magnetically levitated train illustrating a fourth embodiment of the present invention.

In this embodiment, as shown in FIG. 16, a diode 27 is connected in series with the current-attenuation adjusting resistor 26 of the third embodiment, and the polarity of the diode 27 is such that the diode is connected in the forward direction with respect to the current of the superconducting coils.

Figure 17:
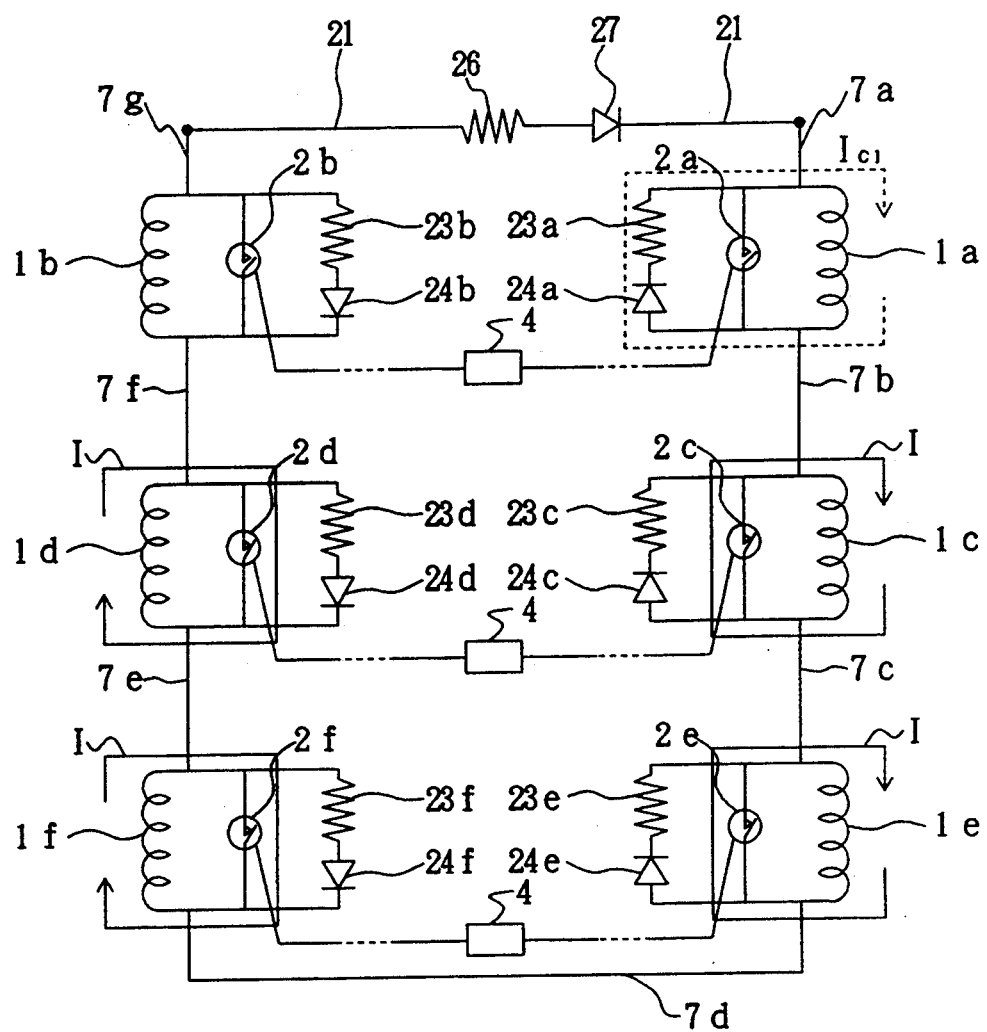
FIG. 17 is a circuit diagram showing a current that flows when a superconducting coil undergoes a normal conductive transition in a superconducting magnet apparatus for a magnetically levitated train illustrating the fourth embodiment of the present invention.
Figure 18:
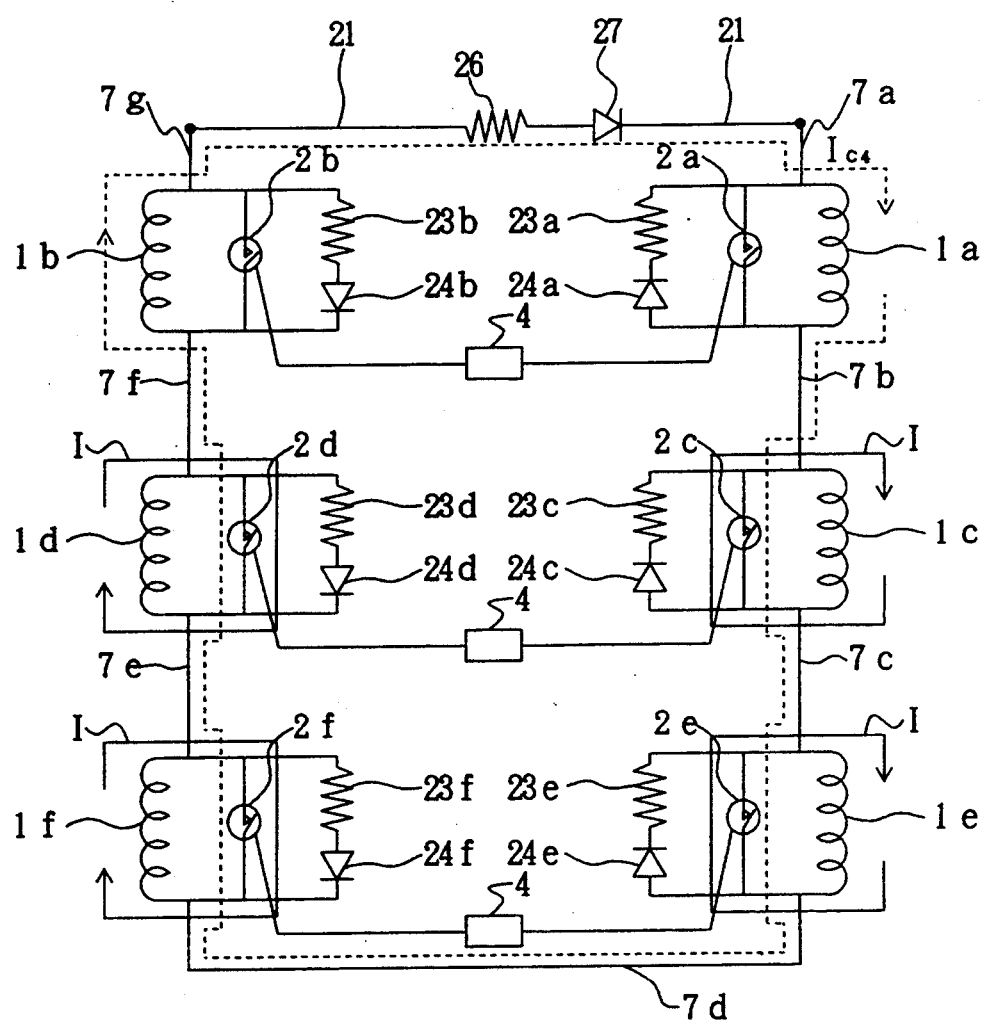
FIG. 18 is a circuit diagram showing a current that flows when a persistent current switch is changed over to the open state for some reason in a superconducting magnet apparatus for a magnetically levitated train illustrating the fourth embodiment of the present invention.

According to this embodiment, when, say, the superconducting coil 1b undergoes the normal conductive transition so that the demagnetizer 4 changes over the persistent current switch 2a of the opposing superconducting coil 1a to the open state, as shown in FIG. 17, the flow of the current from the superconducting coil 1a into the protective resistor 23b is blocked by the diode 24b so that the current $I_{c1}$ of the superconducting coil 1a flows solely through the protective resistor 23a.

Next, a case in which a persistent current switch is changed over to the open state for some reason will be described with reference to FIG. 18.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, a current $I_{c4}$ of the superconducting coils 1b and 1a flows through the path indicated by the arrows composed of the dashed lines in FIG. 18. Since the resistance value (e.g., 0.1Ω) of the current-attenuation adjusting resistor 26 is small and the interconnecting normalsconductive line 21 interconnecting the left and right superconducting magnets and the current lead wires 7a~7g also have small resistance values, the attenuation of the current takes place slowly.

Further, in this embodiment, as shown in FIG. 16, in a case where the power supply 25 is energized without detaching the interconnecting normal conductive line 21 interconnecting the left and right superconducting magnets, the change (dI/dt) in the supply current may be enlarged since the diode 27 is attached in such a manner that a current from the power supply will not be shunted in the current-attenuation adjusting resistor 26. In other words, rapid energization can be carried out.

It should be noted that in a case where the de-energizing operation is performed without detaching the interconnecting normal conductive line 21 interconnecting the left and right superconducting magnets, a current will be shunted to the current-attenuation adjusting resistor 26 as well. As a result, it will be necessary to reduce the change in the current, i.e., to make dI/dt small.

A fifth embodiment of the present invention will now be described with reference to FIGS. 19 through 21.

Figure 19:
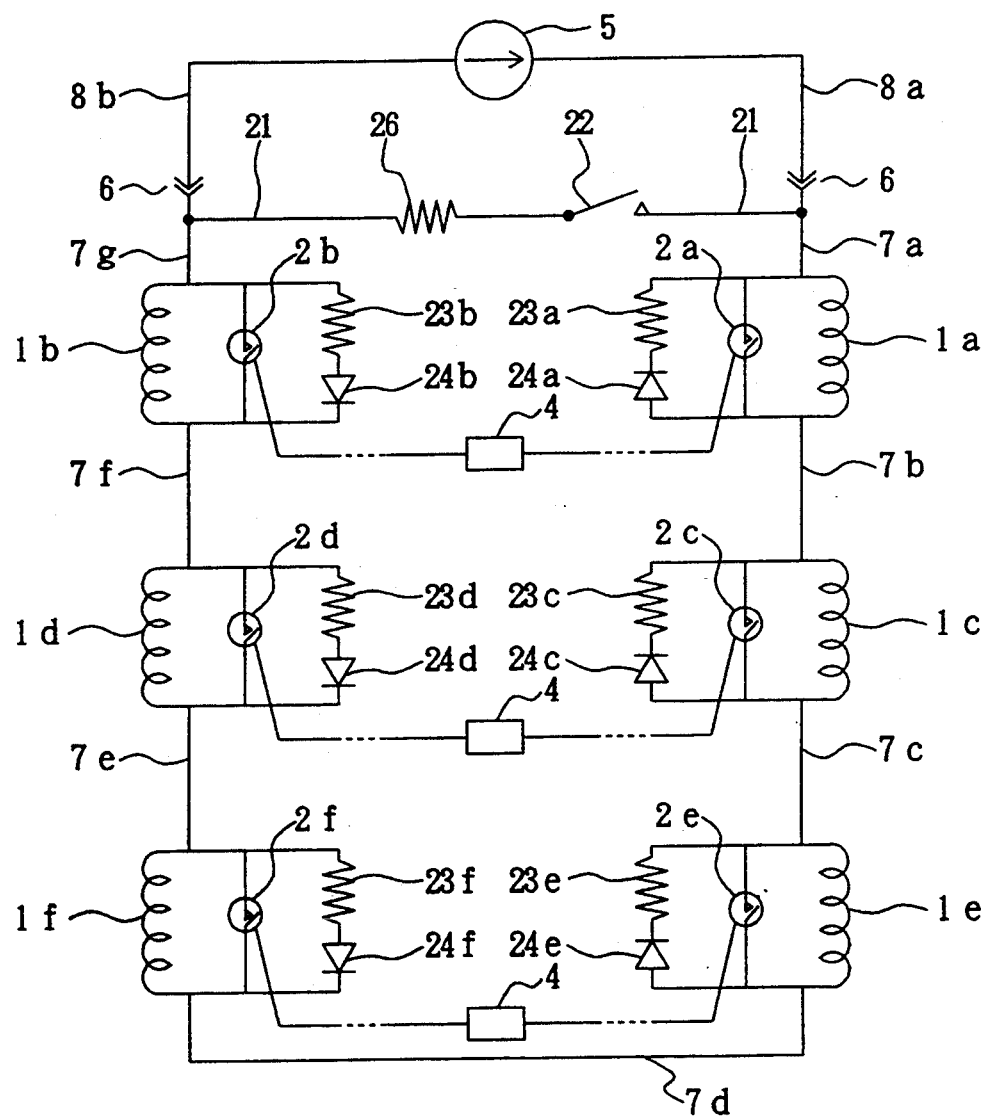
FIG. 19 a circuit diagram of a superconducting magnet apparatus for a magnetically levitated train illustrating a fifth embodiment of the present invention.

In this embodiment, a switch 22 is connected in series with the current-attenuation adjusting resistor 26 of the third embodiment, as shown in FIG. 19.

Figure 20:
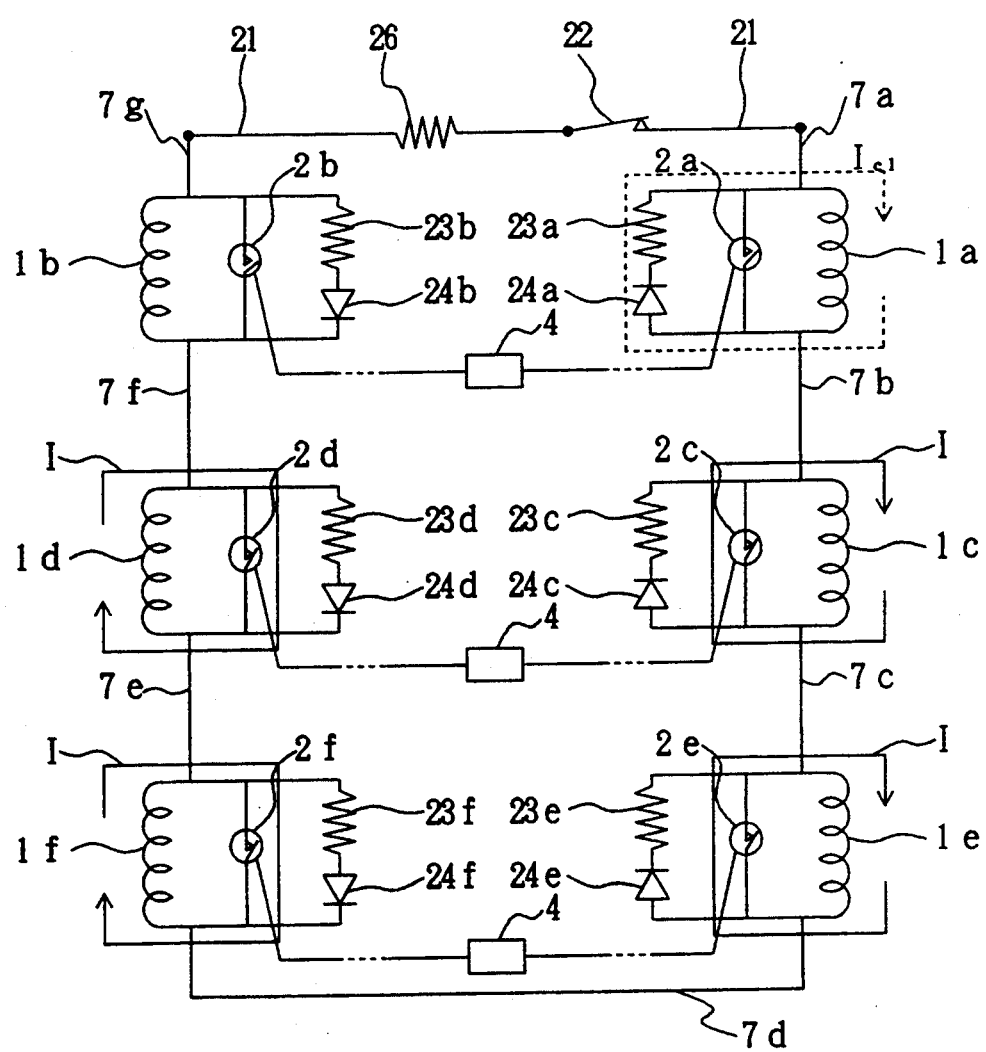
FIG. 20 is a circuit diagram showing a current that flows when a superconducting coil undergoes a normal conductive transition in a superconducting magnet apparatus for a magnetically levitated train illustrating the fifth embodiment of the present invention.
Figure 21:
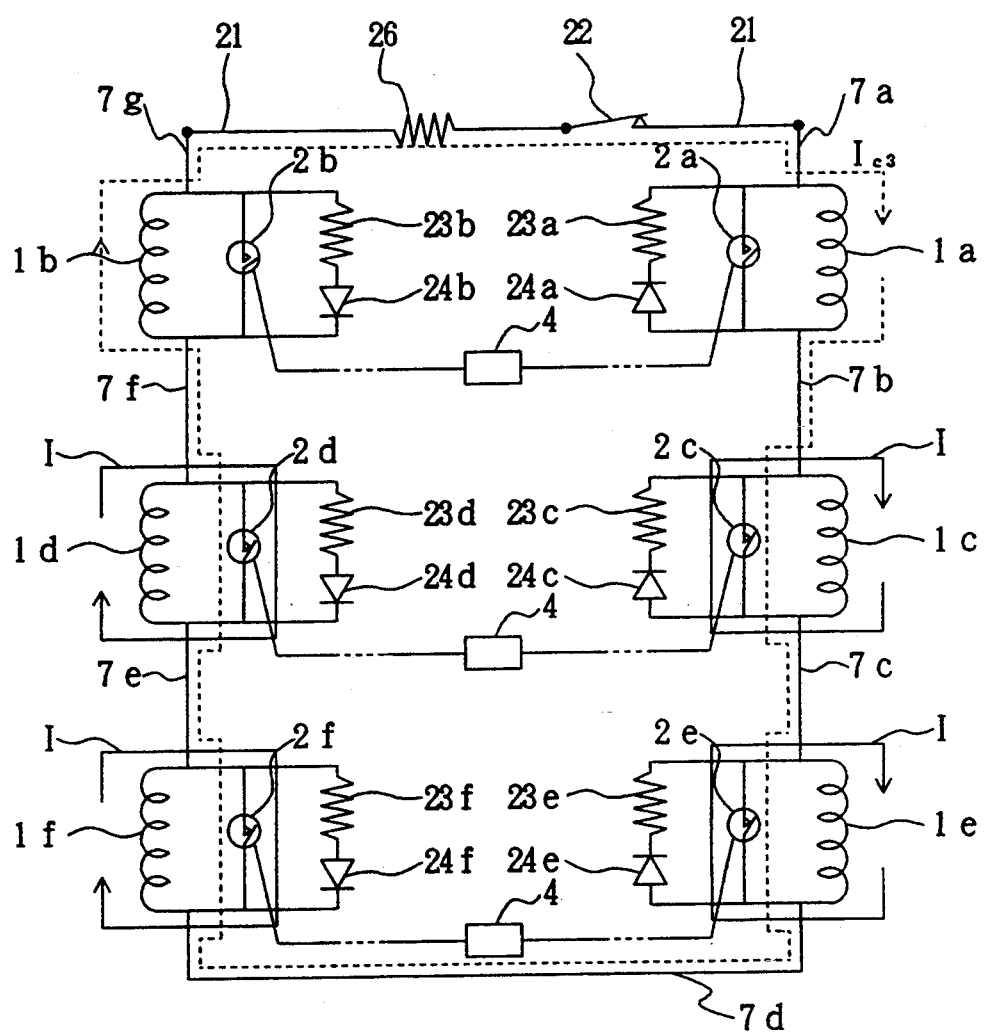
FIG. 21 is a circuit diagram showing a current that flows when a persistent current switch is changed over to the open state for some reason in a superconducting magnet apparatus for a magnetically levitated train illustrating the fifth embodiment of the present invention.

According to this embodiment, when, say, the superconducting coil 1b undergoes the normal conductive transition so that the demagnetizer 4 changes over the persistent current switch 2a of the opposing superconducting coil 1a to the open state, as shown in FIG. 20, the flow of the current from the superconducting coil 1a into the protective resistor 23b is blocked by the diode 24b so that the current $I_{c1}$ of the superconducting coil 1a flows solely through the protective resistor 23a.

Next, a case in which a persistent current switch is changed over to the open state for some reason will be described with reference to FIG. 21.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, the current $I_{c3}$ of the superconducting coils 1b and 1a flows through the path indicated by the arrows composed of the dashed lines in FIG. 21. Since the current-attenuation adjusting resistor 26, the interconnecting normal conductive line 21 interconnecting the left and right superconducting magnets and the current lead wires 7a~7g have small resistance values, the attenuation of the current takes place slowly.

Further, according to this embodiment, in a case where the power supply 5 is connected to the superconducting coils 1a~1f via the connectors 6, as shown in FIG. 19, the supply current from the power supply 5 will not be shunted to the current-attenuation adjusting resistor 26 at energizing and de-energizing of the superconducting coils since it is so arranged that the switch 22 is opened. This makes it possible to reduce the capacity of the power supply 5 correspondingly.

Since the change (dI/dt) in the supply current can be enlarged at energizing and de-energizing of the superconducting coils, the superconducting coil can be energized and de-energized more rapidly.

A sixth embodiment of the present invention will now be described with reference to FIGS. 22 through 23.

Figure 22:
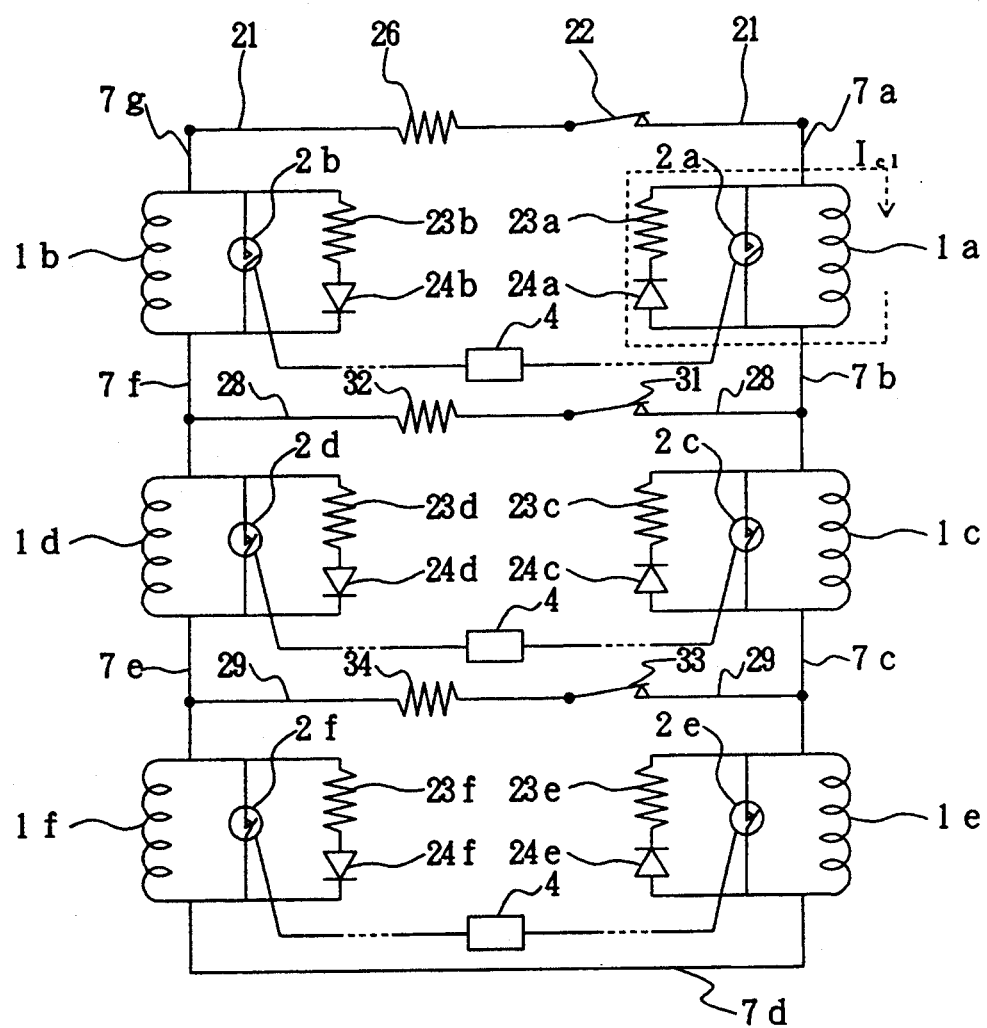
FIG. 22 is a circuit diagram showing a current that flows when a superconducting coil undergoes a normal conductive transition in a superconducting magnet apparatus for a magnetically levitated train illustrating a sixth embodiment of the present invention.

In this embodiment, as shown in FIG. 22, the current lead wires 7b and 7f are capable of being interconnected by an auxiliary interconnecting normal conductive line 28 and the current lead wires 7c and 7e are capable of being interconnected by an auxiliary interconnecting normal conductive line 29 in such a manner that the pairs of superconducting coils 1a and 1b, 1c and 1d, 1e and 1f of the fifth embodiment are formed into individual blocks, thereby constructing a circuit in such a manner that a circulating current can be passed through each pair of opposing superconducting coils. In other words, a switch 31 and a current-attenuation adjusting resistor 32 are serially connected to the auxiliary interconnecting normal conductive line 28, and a switch 33 and a current-attenuation adjusting resistor 34 are serially connected to the auxiliary interconnecting normal conductive line 29.

According to this embodiment, when, say, the superconducting coil 1b undergoes the normal conductive transition so that the demagnetizer 4 changes over the persistent current switch 2a of the opposing superconducting coil 1a to the open state, as shown in FIG. 22, the flow of the current from the superconducting coil 1a into the protective resistor 23b via the current lead wire 7b, auxiliary interconnecting normal conductive line 28, switch 31, current-attenuation adjusting resistor 32, auxiliary interconnecting normal conductive line 28 and current lead wire 7f is blocked by the diode 24b so that the current $I_{c1}$ of the superconducting coil 1a flows solely through the protective resistor 23a.

Next, a case in which a persistent current switch is changed over to the open state for some reason will be described with reference to FIG. 23.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, a current $I_{c4}$ of the superconducting coils 1b and 1a flows through the path indicated by the arrow composed of the dashed line in FIG. 23. That is, the circulating current $I_{c4}$ flows through the circuit comprising the superconducting coil 1a, the current lead wire 7b, the auxiliary interconnecting normal conductive line 28, the switch 31, the current-attenuation adjusting resistor 32, the auxiliary interconnecting normal conductive line 28, the current lead wire 7f, the superconducting coil 1b, the current lead wire 7g, the interconnecting normal conductive line 21, the current-attenuation adjusting resistor 26, the switch 22, the interconnecting normal conductive line 21 and the current lead wire 7a in the order mentioned. Since the current-attenuation adjusting resistors 26, 32, the auxiliary interconnecting normal conductive lines 28, 21, and the current lead wires 7b, 7f, 7g, 7a have small resistance values, the attenuation of the current takes place slowly.

Thus, as set forth above, the left and right superconducting magnets can be interconnected by the auxiliary interconnecting normal conductive lines 28, 29 and a circulating current can be passed through each pair of opposing superconducting coils.

In a case where liquid helium remains after a pair of superconducting coils undergoes the transition to the normal conductive transition and the persistent current switches are restored to the closed state after de-energization, no problems arise in the arrangements of the first through fifth embodiments.

However, in a special case in the first through fifth embodiments wherein all of the liquid helium surrounding a superconducting coil that has undergone a normal conductive transition evaporates so that the superconducting coil and persistent current switch cannot be restored to the closed state and, moreover, another persistent current switch is then changed over to the open state, the resistance of the superconducting coil that has previously undergone the normal conductive transition and the resistance of the persistent current switch become large in the circuit through which the current circulates through the left and right superconducting coils, and the superconducting coil of the persistent current switch that has subsequently been changed over to the open state develops a large current attenuation and undergoes the normal conductive transition.

On the other hand, even in this case the normal conductive transition of a superconducting coil caused by the changeover of the persistent current switch to the open state can be avoided in other blocks according to the sixth embodiment. For example, if the demagnetizer 4 operates owing to the normal conductive transition of the superconducting coil 1d and the liquid helium surrounding the superconducting coil 1c vanishes by evaporation after the superconducting coil 1c also undergoes the normal conductive transition, the superconducting coils 1c, 1d remain in the normal conductive state and the persistent current switches 2c, 2d remain open. The resistance of the superconducting coils in the normal conductive state and the resistance of the open persistent current switches is greater than several tens of ohms. This is a value larger than the resistance value of the protective resistor by more than one place.

Figure 23:
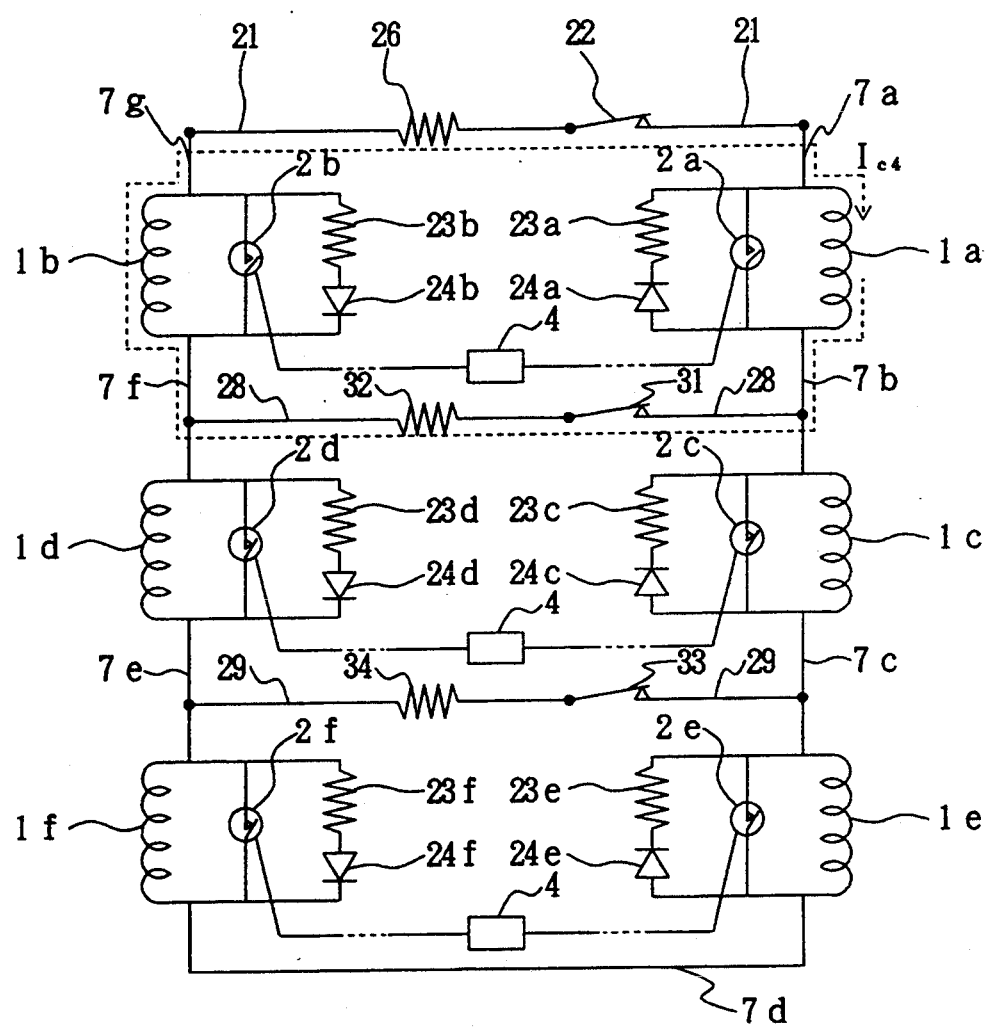
FIG. 23 is a circuit diagram showing a current that flows when a persistent current switch is changed over to the open state for some reason in a superconducting magnet apparatus for a magnetically levitated train illustrating the sixth embodiment of the present invention.

Accordingly, if, say, the persistent current switch 2b is changed over to the open state for some reason under these conditions, then the demagnetizer 4 changes over the persistent current switch 2a to the open state and the current $I_{c4}$ of the superconducting coils 1a, 1b flows through the path indicated by the arrow composed of the dashed line in FIG. 23. Since the resistance of this path is small, the normal conductive transition is not induced in the superconducting coils.

Figure 24:
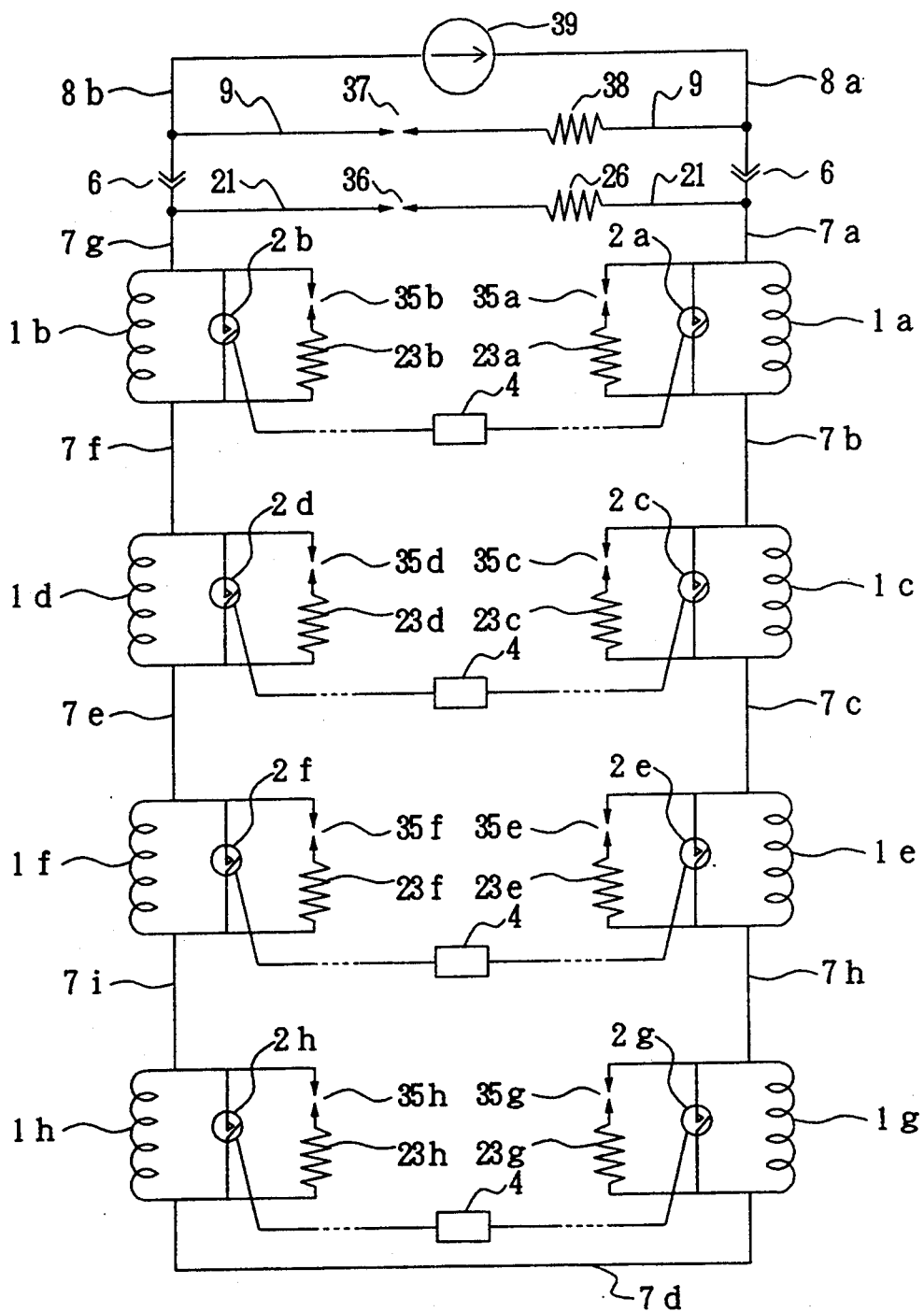
FIG. 24 a circuit diagram of a superconducting magnet apparatus for a magnetically levitated train illustrating a seventh embodiment of the present invention.

A seventh embodiment of the present invention will now be described with reference to FIGS. 24 through 26.

In this embodiment, four superconducting coils are serially connected in each superconducting magnet apparatus arranged on the left and right sides of the magnetically levitated train, and bidirectional switching elements 35a~35h, which are rendered conductive by a voltage greater than a prescribed voltage, are serially connected to the protective resistors 23a~23h, respectively. Furthermore, the current-attenuation adjusting resistor 26 is connected to the interconnecting normal conductive line 21, and a bidirectional switching element 36, which is rendered conductive by a voltage greater than a prescribed voltage, is serially connected to the current-attenuation adjusting resistor 26.

In addition, a connecting line 9 is provided between the power-supply cables 8a, 8b of the power supply 39, and a bidirectional switching element 37, which is rendered conductive by a voltage greater than a prescribed voltage, as well as a resistor 38 are serially connected to the connecting line 9. The arrangement is such that after the superconducting magnet apparatus for a magnetically levitated train is energized and de-energized, the switching element 37 and resistor 38 are disconnected from the superconducting magnet apparatus by the disconnectors 6.

Furthermore, the interconnecting normal conductive line 21 is provided between the current lead wires 7a and 7g on the load side of the disconnectors 6, and the bidirectional switching element 36, which is rendered conductive by a voltage greater than a prescribed voltage, as well as the current-attenuation adjusting resistor 26 are serially connected to the interconnecting normal conductive line 21.

By way of example, the bidirectional switching element 37, which is rendered conductive by a voltage greater than a prescribed voltage, is composed of switch electrodes disposed a minute distance apart in an inert gas (e.g., neon or helium) and is so adapted as to close the circuit by an electric discharge when a voltage is excess of a fixed value is produced across the electrodes.

Figure 25:
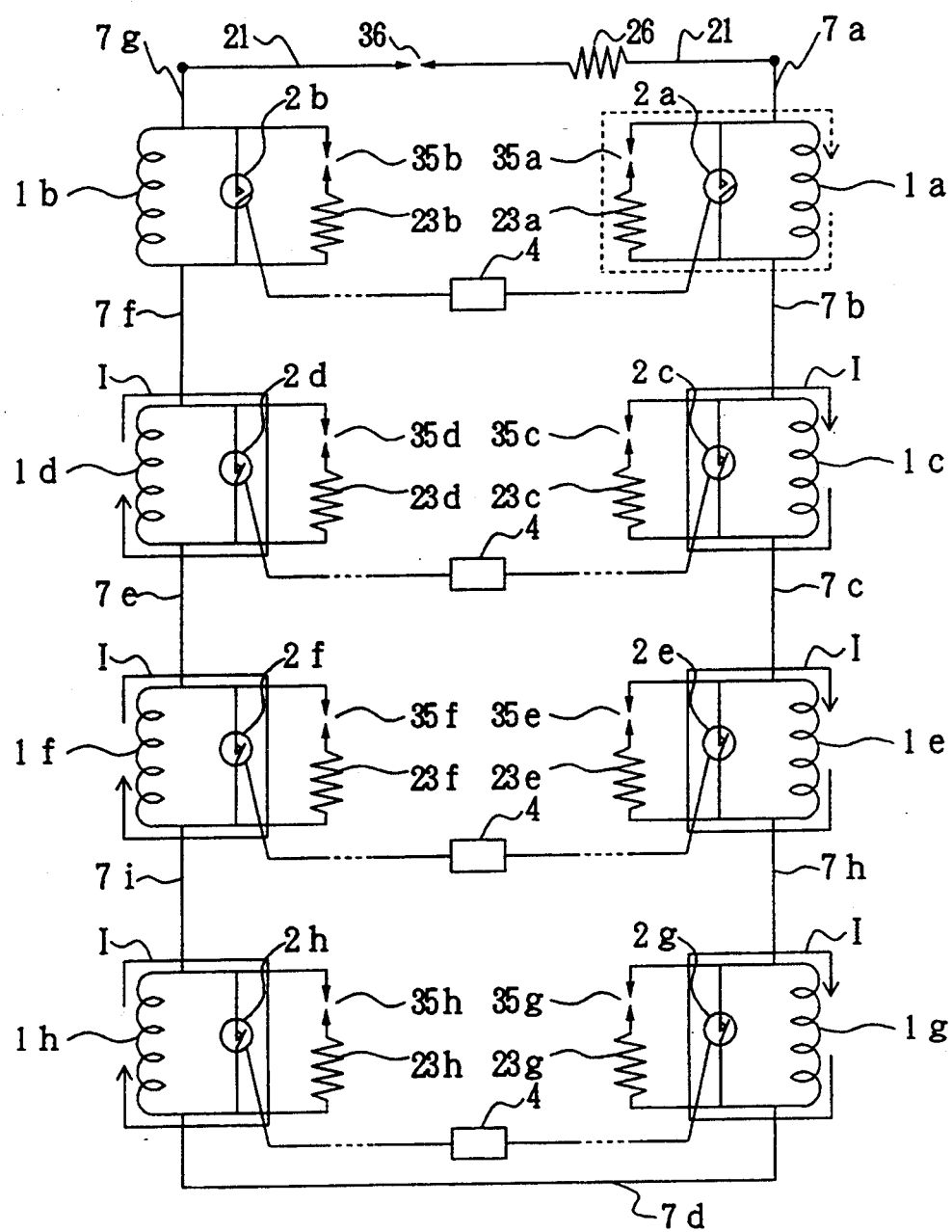
FIG. 25 is a circuit diagram showing a current that flows when a superconducting coil undergoes a normal conductive transition in a superconducting magnet apparatus for a magnetically levitated train illustrating the seventh embodiment of the present invention.
Figure 26:
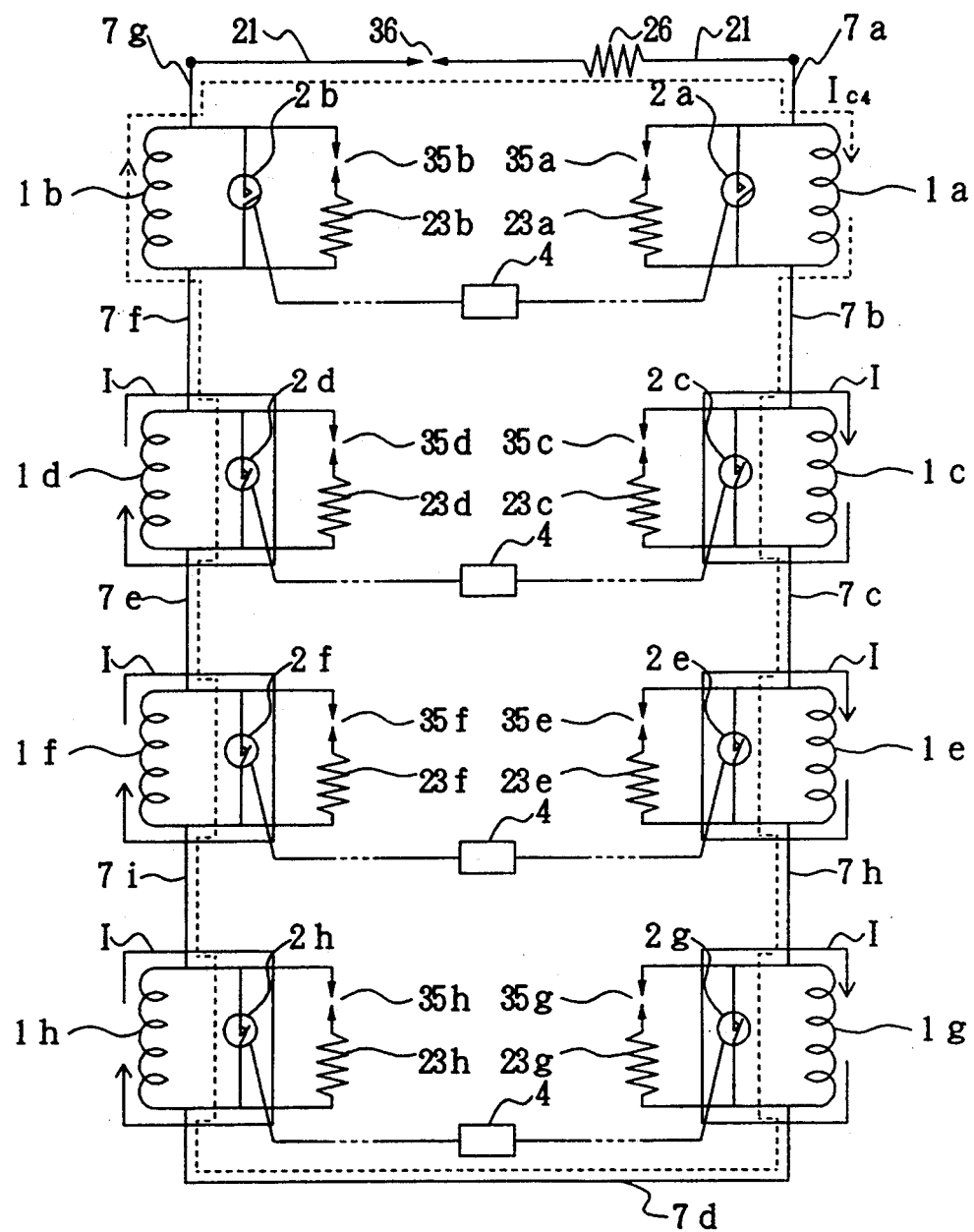
FIG. 26 is a circuit diagram showing a current that flows when a persistent current switch is changed over to the open state for some reason in a superconducting magnet apparatus for a magnetically levitated train illustrating the seventh embodiment of the present invention.
Figure 27:
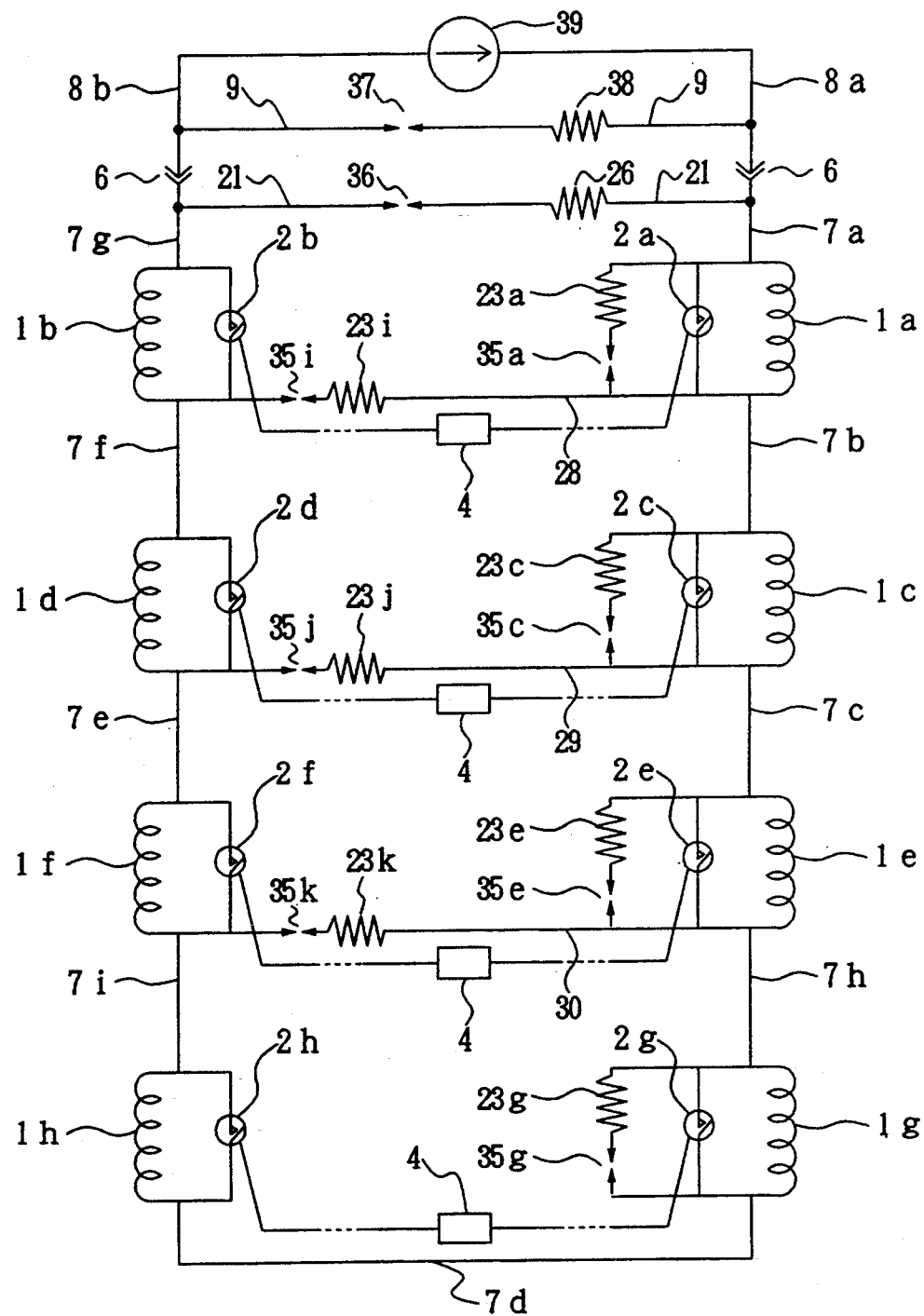
FIG. 27 a circuit diagram of a superconducting magnet apparatus for a magnetically levitated train illustrating an eighth embodiment of the present invention.

According to this embodiment, when, say, the superconducting coil 1b undergoes the normal conductive transition so that the demagnetizer 4 changes over the persistent current switch 2a of the opposing superconducting coil 1a to the open state, as shown in FIG. 25, the current from the superconducting coil 1a flows solely through the protective resistor 23a and the bidirectional switching element 35a.

Next, a case in which a persistent current switch is changed over to the open state for some reason will be described with reference to FIG. 26.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, the current $I_{c4}$ of the superconducting coils 1b and 1a flows through the path indicated by the arrows composed of the dashed line in FIG. 26. That is, the circulating current $I_{c4}$ flows through the circuit comprising the superconducting coil 1a, the current lead wire 7b, the persistent current switch 2c, the current lead wire 7c, the persistent current switch 2e, the current lead wire 7h, the persistent current switch 2g, the current lead wire 7d, the persistent current switch 2h, the current lead wire 7i, the persistent current switch 2f, the current lead wire 7e, the persistent current switch 2d, the current lead wire 7f, the superconducting coil 1b, the current lead wire 7g, the interconnecting normal conductive line 21, the bidirectional switching element 36, the current-attenuation adjusting resistor 26, the interconnecting normal conductive line 21 and the current lead wire 7a in the order mentioned. Since the interconnecting normal conductive line 21, the current-attenuation adjusting resistor 26 and the current lead wires 7b, 7c, 7h, 7d, 7i, 7e, 7f, 7g, 7a have small resistance values, the attenuation of the current takes place slowly.

It should be noted that the resistance value of the resistor 38 is set to be larger than that of the current-attenuation adjusting resistor 26. By connecting the bidirectional switching element 37 and the resistor 38 between the power-supply cables 8a, 8b of the power supply 39, the bidirectional switching element 37 will therefore conduct before the bidirectional switching element 36 if an abnormality occurs when the superconducting magnet apparatus for the magnetically levitated train is energized and de-energized. As a result, the circulating current that will flow is attenuated promptly, thereby making it possible to minimize damage to the circuitry of the superconducting magnet apparatus.

An eighth embodiment of the present invention will now be described with reference to FIGS. 27 through 30.

In this embodiment, the four superconducting coils 1a, 1c, 1e, 1g are serially connected in the superconducting magnet apparatus arranged on the right side of the magnetically levitated train, the persistent current switches 2a, 2c, 2e, 2g are provided across the superconducting coils 1a, 1c, 1e, 1g, respectively, the protective resistors 23a, 23c, 23e, 23g are serially connected to the bidirectional switching elements 35a, 35c, 35e, 35g, respectively, which are rendered conductive by a voltage greater than a prescribed voltage, and the resulting series circuits are connected across the persistent current switches 2a, 2c, 2e, 2g, respectively.

Further, the four superconducting coils 1b, 1d, 1f, 1h are serially connected in the superconducting magnet apparatus arranged on the left side of the magnetically levitated train, and the persistent current switches 2b, 2d, 2f, 2h are provided across the superconducting coils 1b, 1d, 1f, 1h, respectively. Furthermore, as in the sixth embodiment, auxiliary interconnecting normal conductive lines 28, 29, 30 are connected across the pairs of left and right superconducting coils 1a and 1b, 1c and 1d, 1e and 1f, respectively.

In addition, a protective resistor 23i and a bidirectional switching element 35i, which is rendered conductive by a voltage greater than a prescribed voltage, connected in series therewith are connected to the auxiliary interconnecting normal conductive line 28, a protective resistor 23j and a bidirectional switching element 35j, which is rendered conductive by a voltage greater than a prescribed voltage, connected in series therewith are connected to the auxiliary interconnecting normal conductive line 29, and a protective resistor 23k and a bidirectional switching element 35k, which is rendered conductive by a voltage greater than a prescribed voltage, connected in series therewith are connected to the auxiliary interconnecting normal conductive line 30. The connecting line 9 is provided between the power-supply cables 8a, 8b of the power supply 39, and the bidirectional switching element 37, which is rendered conductive by a voltage greater than a prescribed voltage, as well as the resistor 38 are serially connected to the connecting line 9. The arrangement is such that after the superconducting magnet apparatus for a magnetically levitated train is energized and de-energized, the switching element 37 and resistor 38 are disconnected from the superconducting magnet apparatus by the disconnectors 6.

Furthermore, the interconnecting normal conductive line 21 is provided between the current lead wires 7a and 7g on the load side of the disconnectors 6, and the bidirectional switching element 36, which is rendered conductive by a voltage greater than a prescribed voltage, as well as the current-attenuation adjusting resistor 26 are serially connected to the interconnecting normal conductive line 21.

Figure 28:
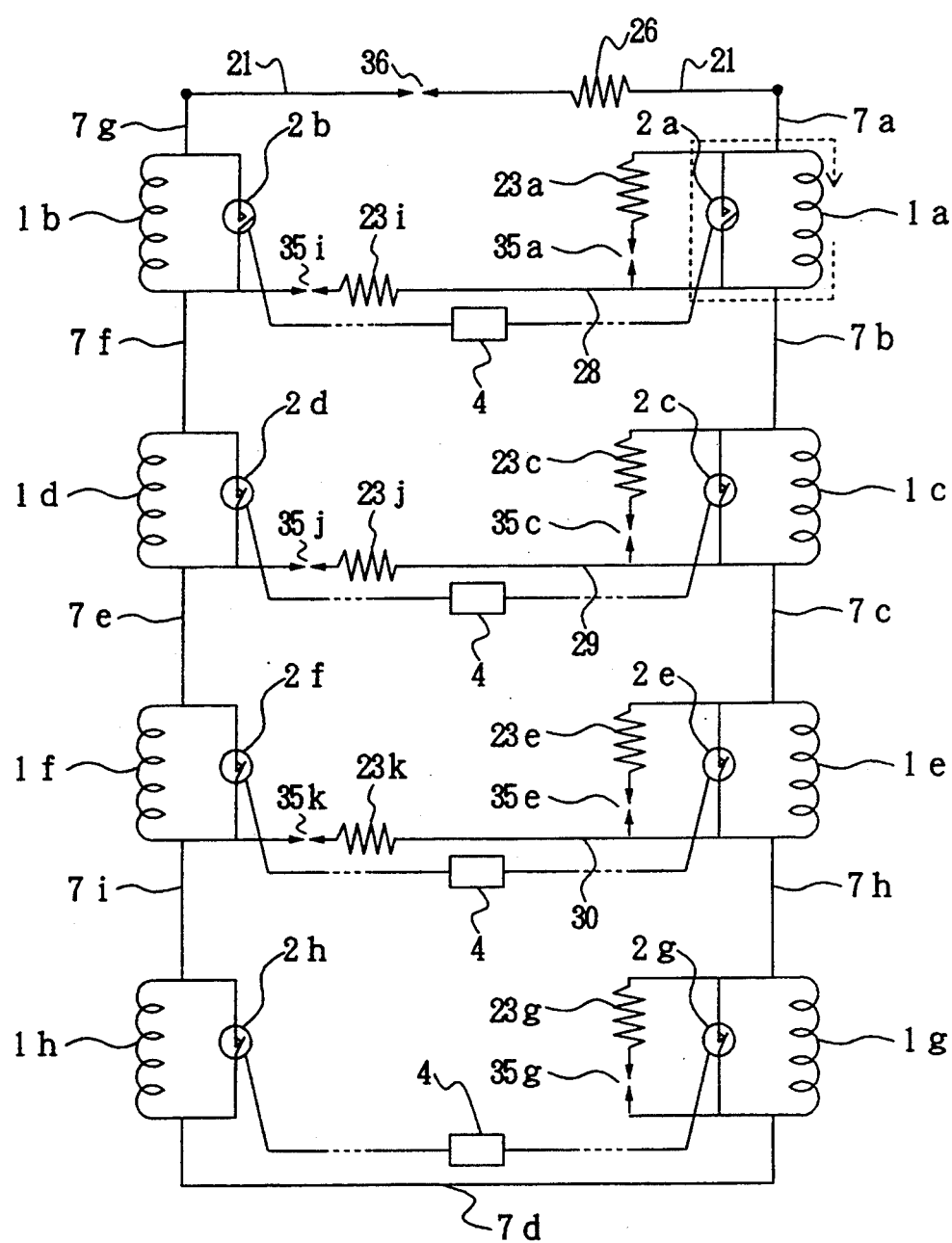
FIG. 28 is a circuit diagram showing a current that flows when a superconducting coil undergoes a normal conductive transition on the left side of a superconducting magnet apparatus for a magnetically levitated train illustrating the eighth embodiment of the present invention.
Figure 29:
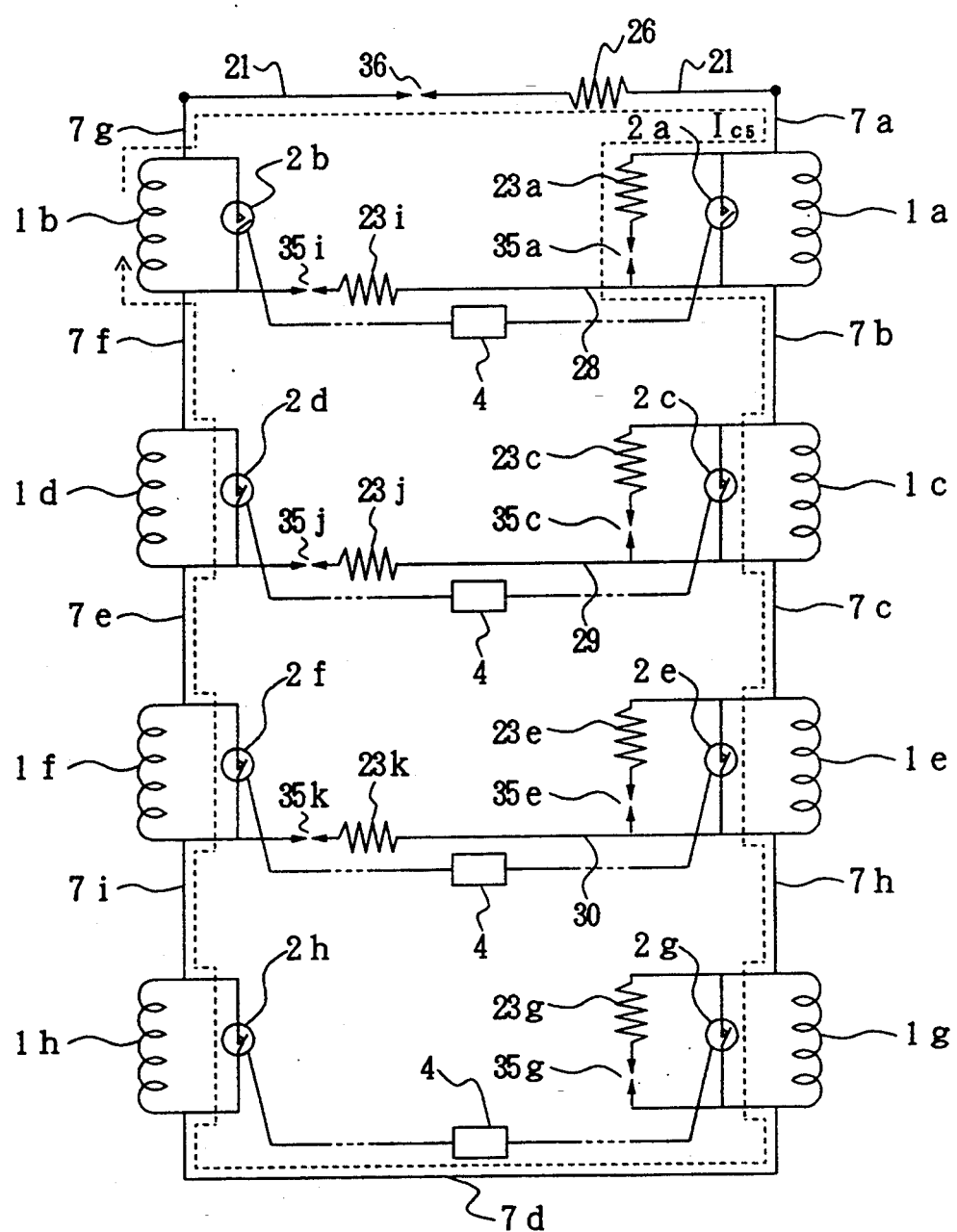
FIG. 29 is a circuit diagram showing a current that flows when a superconducting coil undergoes a normal conductive transition on the right side of a superconducting magnet apparatus for a magnetically levitated train illustrating the eighth embodiment of the present invention.

According to this embodiment, when, say, the superconducting coil 1b on the left side undergoes the normal conductive transition so that the demagnetizer 4 changes over the persistent current switch 2a of the opposing superconducting coil 1a to the open state, as shown in FIG. 28, the current from the superconducting coil 1a flows solely through the bidirectional switching element 35a and the protective resistor 23a. Immediately after the superconducting coil 1b undergoes the normal conductive transition, so does the superconducting coil 1a so that the magnetic field distribution produced by the left and right superconducting magnets is rendered symmetrical. As a result, an abnormal electromagnetic repulsive force is not produced.

Next, when the superconducting coil 1a on the right side undergoes the normal conductive transition so that the demagnetizer 4 changes over the persistent current switch 2b of the opposing superconducting coil 1b to the open state, a current $I_{c5}$ of the superconducting coil 1b flows through a closed circuit constituted by the superconducting coil 1b, the current lead wire 7g, the interconnecting normal conductive line 21, the bidirectional switching element 36, the current-attenuation adjusting resistor 26, the interconnecting normal conductive line 21, the current lead wire 7a, the protective resistor 23a, the bidirectional switching element 35a, the current lead wire 7b, the persistent current switch 2c, the current lead wire 7c, the persistent current switch 2e, the current lead wire 7h, the persistent current switch 2g, the current lead wire 7d, the persistent current switch 2h, the current lead wire 7i, the persistent current switch 2f, the current lead wire 7e, the persistent current switch 2d and the current lead wire 7f in the order mentioned.

In this case, the current-attenuation adjusting resistor 26 (e.g., 0.1Ω) and the protective resistor 23a (e.g., 0.6Ω) are serially connected. Consequently, the combined resistance value of this circuit is enlarged to 0.7Ω, for example, so that the superconducting coil 1b is caused to undergo the normal conductive transition promptly. The magnetic field distribution produced by the left and right superconducting magnets is rendered symmetrical so that an abnormal electromagnetic repulsive force is not produced.

Figure 30:
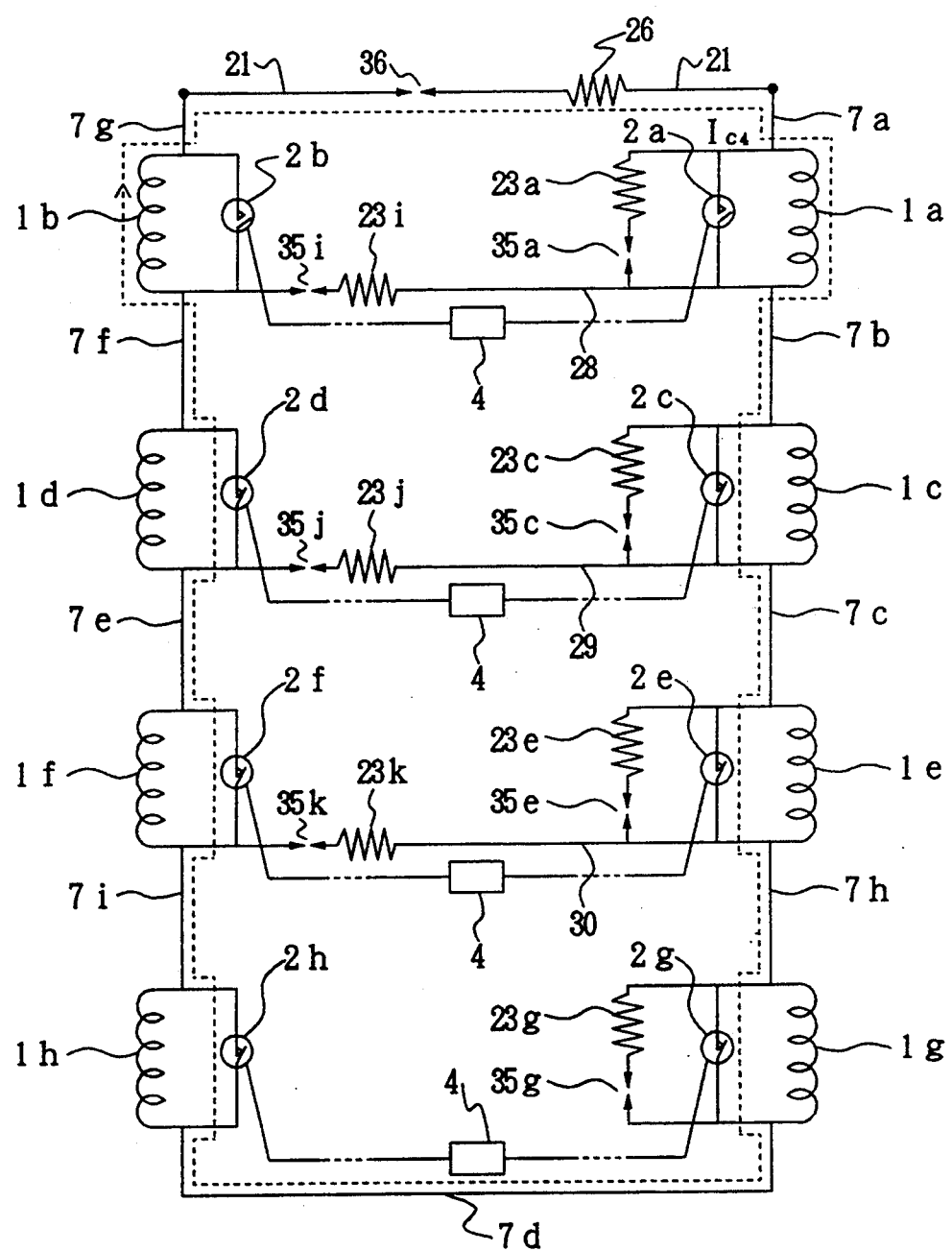
FIG. 30 is a circuit diagram showing a current that flows when a persistent current switch is changed over to the open state for some reason in a superconducting magnet apparatus for a magnetically levitated train illustrating the eighth embodiment of the present invention.

Next, a case in which a persistent current switch is changed over to the open state for some reason will be described with reference to FIG. 30.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, the current $I_{c4}$ of the superconducting coils 1b and 1a flows through the path indicated by the arrow composed of the dashed line in FIG. 30. That is, the current flows through the closed circuit constituted by the superconducting coil 1b, the current lead wire 7g, the interconnecting normal conductive line 21, the bidirectional switching element 36, the current-attenuation adjusting resistor 26, the interconnecting normal conductive line 21, the current lead wire 7a, the superconducting coil 1a, the current lead wire 7b, the persistent current switch 2c, the current lead wire 7c, the persistent current switch 2e, the current lead wire 7h, the persistent current switch 2g, the current lead wire 7d, the persistent current switch 2h, the current lead wire 7i, the persistent current switch 2f, the current lead wire 7e, the persistent current switch 2d and the current lead wire 7f in the order mentioned.

Since the resistance value (e.g., 0.1Ω) of the current-attenuation adjusting resistor 26 is small, the current is attenuated slowly so that the superconducting coil is not allowed to undergo the normal conductive transition.

In the seventh embodiment described above, a total of eight protective resistors are required. By adopting the arrangement of the eighth embodiment, however, the number of protective resistors can be reduced to seven. This makes it possible to reduce space and cost correspondingly and to lighten the weight of the magnetically levitated train.

Figure 31:
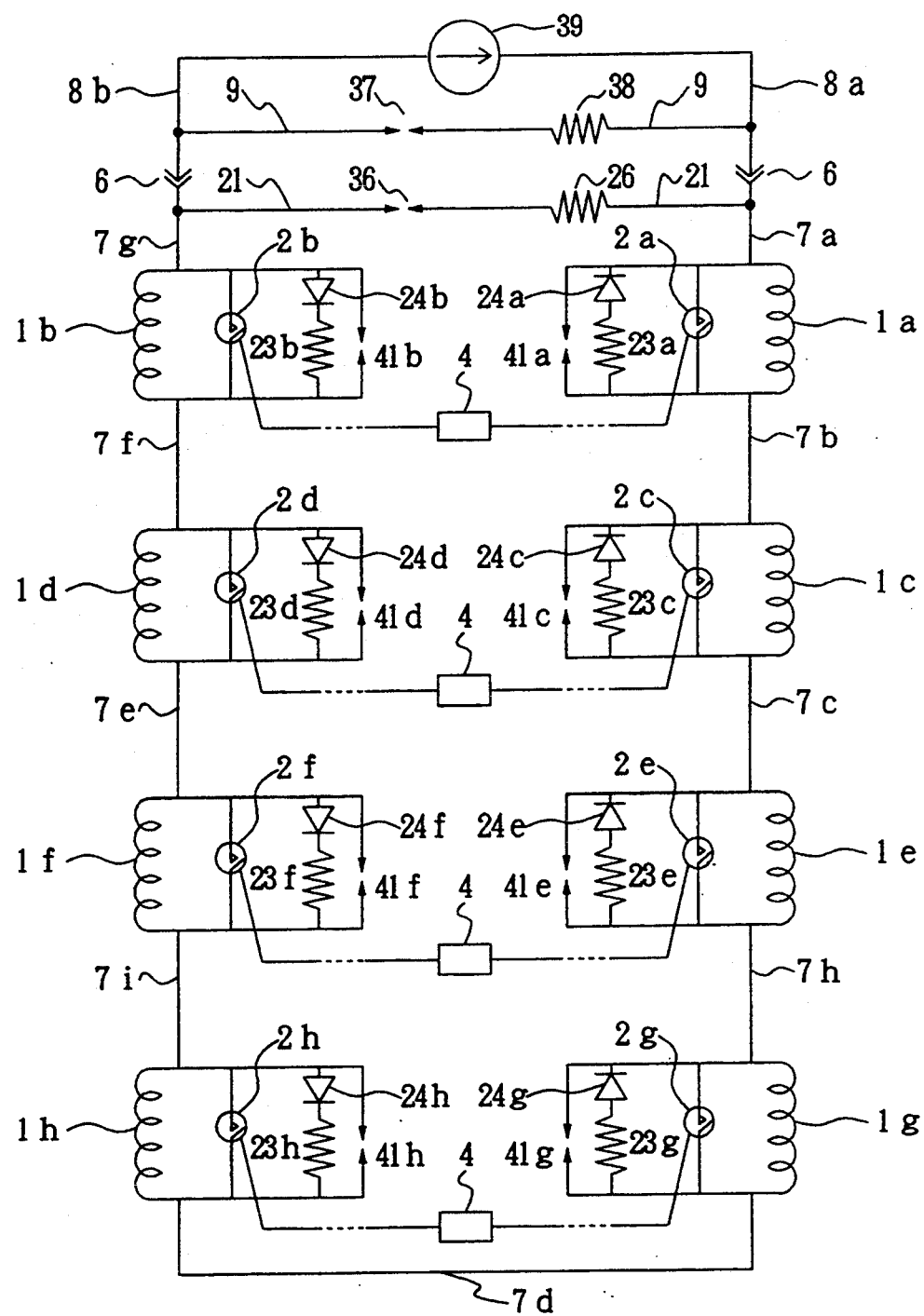
FIG. 31 a circuit diagram of a superconducting magnet apparatus for a magnetically levitated train illustrating a ninth embodiment of the present invention.

A ninth embodiment of the present invention will now be described with reference to FIGS. 31 through 33.

In this embodiment, four superconducting coils are serially connected in each superconducting magnet apparatus arranged on the left and right sides of the magnetically levitated train, and the diodes 24a~24f are serially connected to the protective resistors 23a~23h, respectively. The polarity of each diode is such that the diode is connected in the forward direction with respect to the current of the corresponding superconducting coil. Furthermore, bidirectional switching elements 41a~41h, which are rendered conductive by a voltage greater than a prescribed voltage, are connected in parallel with respective ones of the diodes 24a~24h serially connected to the protective resistors 23a~23f, respectively.

Further, as in the eighth embodiment, the interconnecting normal conductive line 21 is provided between the current lead wires 7a and 7g on the load side of the disconnectors 6, and the bidirectional switching element 36, which is rendered conductive by a voltage greater than a prescribed voltage, as well as the current-attenuation adjusting resistor 26 are serially connected to the interconnecting normal conductive line 21.

In addition, the connecting line 9 is provided between the power-supply cables 8a, 8b of the power supply 39, and the bidirectional switching element 37, which is rendered conductive by a voltage greater than a prescribed voltage, as well as the resistor 38 are serially connected to the connecting line 9. The arrangement is such that after the superconducting magnet apparatus for a magnetically levitated train is energized and de-energized, the switching element 37 and resistor 38 are disconnected from the superconducting magnet apparatus by the disconnectors 6.

Figure 32:
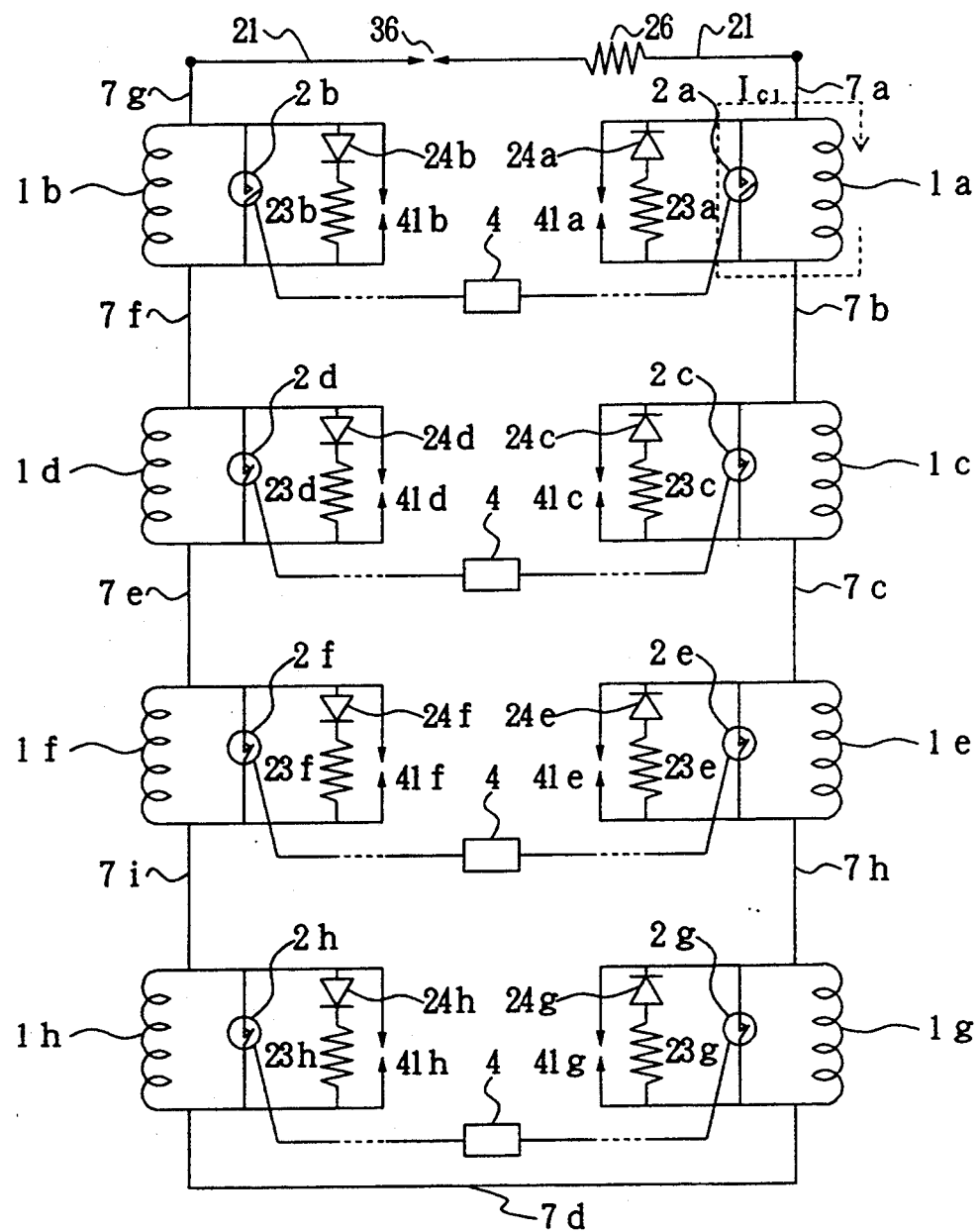
FIG. 32 is a circuit diagram showing a current that flows when a superconducting coil undergoes a normal conductive transition in a superconducting magnet apparatus for a magnetically levitated train illustrating the ninth embodiment of the present invention.
Figure 33:
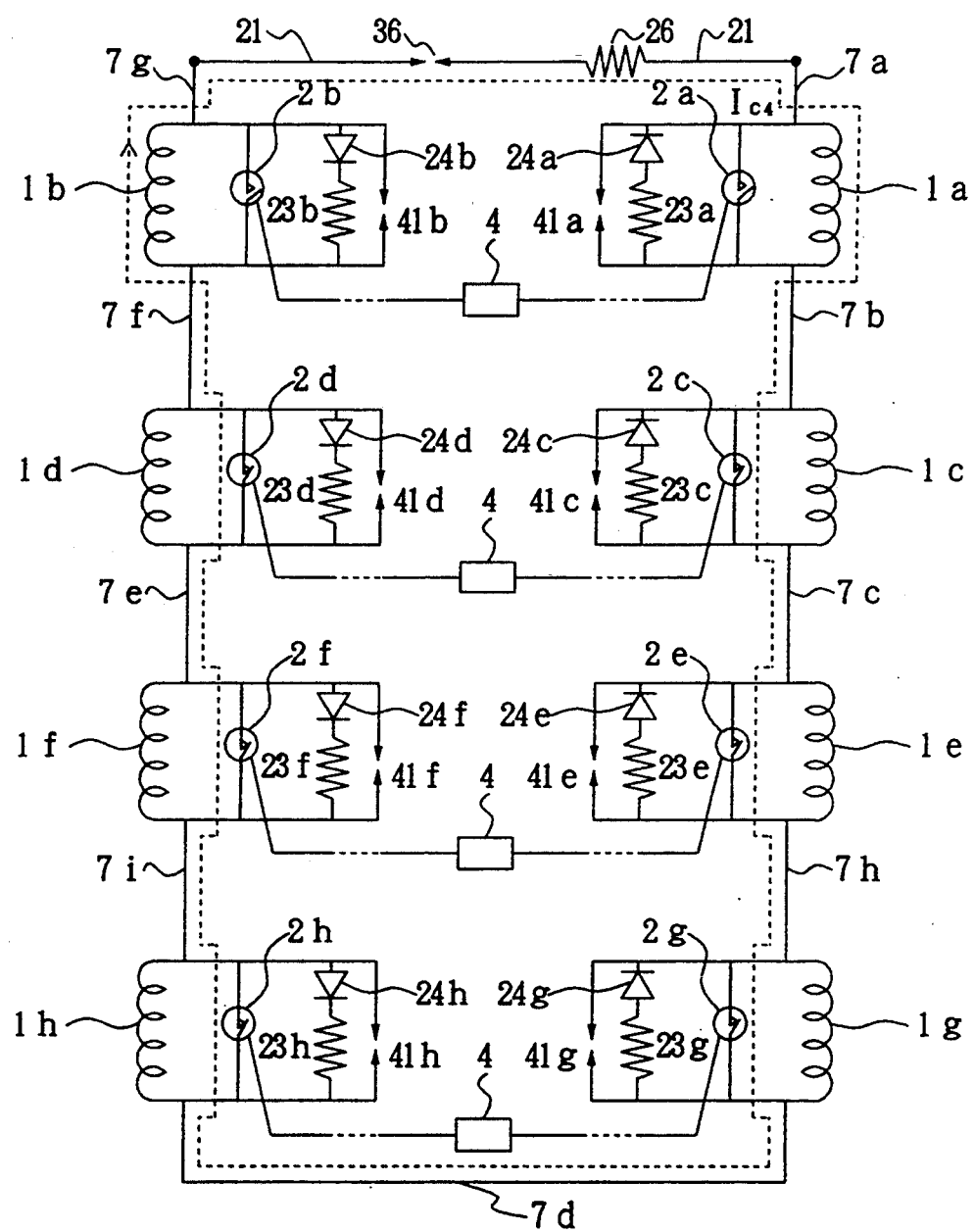
FIG. 33 is a circuit diagram showing a current that flows when a persistent current switch is changed over to the open state for some reason in a superconducting magnet apparatus for a magnetically levitated train illustrating the ninth embodiment of the present invention.

According to this embodiment, when, say, the superconducting coil 1b undergoes the normal conductive transition so that the demagnetizer 4 changes over the persistent current switch 2a of the opposing superconducting coil 1a to the open state, as shown in FIG. 32, the current $I_{c1}$ of the superconducting coil 1a flows solely through the protective resistor 23a and the diode 24a.

Next, a case in which a persistent current switch is changed over to the open state for some reason will be described with reference to FIG. 33.

If, say, the persistent current switch 2b is changed over to the open state by some disturbance, the demagnetizer 4 heats the heater of the opposing persistent current switch 2a so that the switch 2a is changed over to the open state. When the persistent current switches 2a, 2b are thus changed over to the open state, the current $I_{c4}$ of the superconducting coils 1b and 1a flows through the path indicated by the arrow composed of the dashed line in FIG. 33. That is, the circulating current $I_{c4}$ flows through the circuit comprising the superconducting coil 1a, the current lead wire 7b, the persistent current switch 2c, the current lead wire 7c, the persistent current switch 2e, the current lead wire 7h, the persistent current switch 2g, the current lead wire 7d, the persistent current switch 2h, the current lead wire 7i, the persistent current switch 2f, the current lead wire 7e, the persistent current switch 2d, the current lead wire 7f, the superconducting coil 1b, the current lead wire 7g, the interconnecting normal conductive line 21, the bidirectional switching element 36, the current-attenuation adjusting resistor 26, the interconnecting normal conductive line 21 and the current lead wire 7a in the order mentioned. Since the current-attenuation adjusting resistor 26 and the current lead wires 7b, 7c, 7h, 7d, 7i, 7e, 7f, 7g, 7a have small resistance values, the attenuation of the current takes place slowly.

By providing the bidirectional switching elements 41a~41h, the bidirectional switching elements 41a~41h will be rendered conductive by electrically discharging in a case where an abnormal voltage is produced across the respective superconducting coils 1a~1h. This makes it possible to suppress the abnormal voltage.

With regard to the conditions for setting the voltage at which the bidirectional switching elements 41a~41h start to discharge, a value is set that is greater than a voltage produced in each of the superconducting coils 1a~1h at the time of energization and de-energization of a normally operating superconducting magnet, or a voltage generated across any opened one of the persistent current switches 2a~2h when any of the persistent current switches 2a~2h undergoes the normal conductive transition and opens in a state in which the persistent current mode has been established and a current is flowing through the closed circuit constructed by the respective pair of the superconducting coils 1a~1h and persistent current switches $2a\sim 2h$. Further, this value is less than a voltage that will cause the superconducting coils $1a\sim 1h$ and persistent current switches $2a\sim 2h$ to burn or fuse or a voltage that will lead to a discharge phenomenon within the superconducting magnet apparatus.

The present invention is not limited to the above-described embodiments but can be modified in various ways based upon the gist of the invention without departing from the scope of the claims thereof.

(1) In accordance with the superconducting magnet apparatus for a magnetically levitated train according to the first embodiment of the present invention, when one superconducting coil undergoes a normal conductive transition for some reason while the train is traveling, the opposing superconducting coil also can be made to undergo the normal conductive transition within one second. Moreover, when a persistent current switch is changed over to the open state, the superconducting coil is not allowed to undergo the normal conductive transition merely by changing over the opposing persistent current switch to the open state.

Accordingly, the symmetry of the magnetic field distribution produced by the left and right superconducting coils is maintained and it is possible to prevent the generation of an electromagnetic force that attempts to push the train against a side wall of the guideway. As a result, the reinforcing strength of the guideway can be reduced and construction costs can be lowered.

Further, in the case where a persistent current switch is merely changed over to the open state, as well as in the case where the demagnetizer malfunctions, it suffices to merely change over the opposing persistent current switch to the open state so that the normal conductive transition will not be induced in the superconducting coil. As a result, it is possible in both of these cases to prevent loss of liquid helium that accompanies the normal conductive transition of a superconducting coil.

(2) In accordance with the superconducting magnet apparatus for a magnetically levitated train according to the second embodiment of the present invention, the effects of the first embodiment described above are supplemented. Specifically, diodes are serially connected to the protective resistors in the forward direction with respect to the direction of the current generated by the corresponding superconducting coils, thereby blocking the flow of current of the opposing superconducting coil into the protective resistor of the superconducting coil that has undergone the normal conductive transition. As a result, the resistance value of the protective resistor can be halved, thereby contributing to a reduction in the weight of the magnetically levitated train.

(3) In accordance with the superconducting magnet apparatus for a magnetically levitated train according to the third embodiment of the present invention, the effects of the second embodiment described above are supplemented. Specifically, when a persistent current switch is changed over to the open state and the current of a superconducting coil flows into the interconnecting normal conductive line interconnecting the left and right superconducting magnets, the time needed for current attenuation can be adjusted within limits that will not allow a superconducting coil to undergo the normal conductive transition. By limiting the time needed for current attenuation, the capacity of the interconnecting normal conductive line with regard to conduction time can be reduced to lighten the weight of the magnetically levitated train. Furthermore, the interconnecting normal conductive line to which the current-attenuation adjusting resistor is connected is left connected after the superconducting coils are energized and de-energized, and it is unnecessary to open the interconnecting normal conductive line. This means that operation is simple.

(4) In accordance with the superconducting magnet apparatus for a magnetically levitated train according to the fourth embodiment of the present invention, the supply current from the power supply is not shunted to the interconnecting normal conductive line when the superconducting coils are energized. As a result, the capacity of the power supply can be reduced and the power-supply equipment cost can be lowered. In addition, energization can be performed rapidly.

(5) In accordance with the superconducting magnet apparatus for a magnetically levitated train according to the fifth embodiment of the present invention, effects similar to those of the third embodiment are obtained. Specifically, when a persistent current switch is changed over to the open state and the current of a superconducting coil flows into the interconnecting normal conductive line interconnecting the left and right superconducting magnets, the time needed for current attenuation can be adjusted within limits that will not allow a superconducting coil to undergo the normal conductive transition. By limiting the time needed for current attenuation, the capacity of the interconnecting normal conductive line with regard to conduction time can be reduced to lighten the weight of the magnetically levitated train. Furthermore, the superconducting coils can be energized and de-energized rapidly by opening the switch provided in the interconnecting normal conductive line.

(6) In accordance with the superconducting magnet apparatus for a magnetically levitated train according to the sixth embodiment of the present invention, the effects of the fifth embodiment described above are supplemented. Specifically, it is arranged so that a circulating current flows into each pair of opposing superconducting coils. Therefore, irrespective of the state of other superconducting coils, the normal conductive transition will not be induced in a superconducting coil because its persistent current switch is open.

(7) In accordance with the superconducting magnet apparatus for a magnetically levitated train according to the seventh embodiment of the present invention, effects similar to those of the third embodiment are obtained. Specifically, when a persistent current switch is changed over to the open state and the current of a superconducting coil flows into the interconnecting normal conductive line interconnecting the left and right superconducting magnets, the time needed for current attenuation can be adjusted within limits that will not allow a superconducting coil to undergo the normal conductive transition. By limiting the time needed for current attenuation, the capacity of the interconnecting normal conductive line with regard to conduction time can be reduced to lighten the weight of the magnetically levitated train. Furthermore, since the interconnecting normal conductive line is opened at energization and de-energization of the superconducting coils by the bidirectional switch, which conducts in response to a voltage greater than a prescribed voltage, provided in the interconnecting normal conductive line, the supply current from the power supply will not be shunted to the interconnecting normal conductive line. As a result, the capacity of the power supply can be reduced and the power-supply equipment cost can be lowered. In addition, energization and de-energization can be performed rapidly.

(8) In accordance with the superconducting magnet apparatus for a magnetically levitated train according to the eighth embodiment of the present invention, the effects of the seventh embodiment described above are supplemented. Specifically, the number of protective resistors can be reduced as well as space and cost, and the magnetically levitated train can be made lighter in weight.

(9) In accordance with the superconducting magnet apparatus for a magnetically levitated train according to the ninth embodiment of the present invention, the effects of the seventh embodiment described above are supplemented. Specifically, by providing the bidirectional switching elements in parallel with the superconducting coils, the bidirectional switching elements will be rendered conductive by electrically discharging automatically in a case where an abnormal voltage is produced across the respective superconducting coils. This makes it possible to suppress the abnormal voltage.

What we claim is:

1. A superconducting magnet apparatus for a magnetically levitated train in which serially connected superconducting magnets, which are energized and de-energized via disconnectors from a power supply installed on a vehicle of the train, are provided by being mounted in a pair on both sides of the magnetically levitated train that oppose guiding ground coils of a magnetically levitated railway when the magnetically levitated train is traveling, each superconducting magnet has a plurality of serially connected superconducting coils, persistent current switches are parallel-connected across respective ones of said superconducting coils, and demagnetizers are provided for linking and changing over corresponding persistent current switches mounted in pairs on both sides of the magnetically levitated train, said superconducting magnet apparatus comprising:
   (a) an interconnecting normal conductive line which, when said power supply is cut off from said disconnectors, is connected between current lead wires, which are nearest to said power supply, on a load side of said disconnectors, for serially interconnecting all of said superconducting coils so that a circulating current can be passed through them; and
   (b) protective resistors having resistance values of such size that when a superconducting coil undergoes a normal conductive transition and current in the superconducting coil opposing said superconducting coil is commutated from the persistent current switch, said opposing superconducting coil is caused to undergo a normal conductive transition.

2. The apparatus according to claim 1, wherein the protective resistors are connected in parallel with corresponding ones of said superconducting coils.

3. The apparatus according to claim 2, wherein said interconnecting normal conductive line is provided with a switch or with connecting portions by which said interconnecting normal conductive line is capable of being freely detached.

4. The apparatus according to claim 2, wherein a diode is serially connected to each protective resistor in such a direction that it will pass only the current produced by the superconducting coil to which said protective resistor is serially connected.

5. The apparatus according to claim 2, wherein each protective resistor has a resistance value R and each superconducting coil has a self-inductance L, where the relation $9 \geqq L/R$ holds.

6. The apparatus according to claim 4, wherein a current-attenuation adjusting resistor, which has a resistance value that does not undergo a normal conductive transition, is connected to said interconnecting normal conductive line when a persistent current switch malfunctions and the current of the superconducting coil is commutated from the persistent current switch.

7. The apparatus according to claim 6, wherein said current-attenuation adjusting resistor has a resistance value r and each superconducting coil has a self-inductance L, where the relation $19 \leqq L/r$ holds.

8. The apparatus according to claim 6, wherein a diode is serially connected to said current-attenuation adjusting resistor.

9. The apparatus according to claim 6, wherein a switch is serially connected to said current-attenuation adjusting resistor.

10. The apparatus according to claim 9, wherein auxiliary interconnecting normal conductive lines are connected in such a manner that a circulating current can be passed through each pair of opposing superconducting coils.

11. The apparatus according to claim 2, wherein a bidirectional switch that conducts in response to a voltage greater than a prescribed voltage is serially connected to each of said protective resistors, and a bidirectional switch that conducts in response to a voltage greater than a prescribed voltage is serially connected to said interconnecting normal conductive line.

12. The apparatus according to claim 1, wherein said protective resistors are connected across the corresponding superconducting coils arranged on one side of said magnetically levitated train, bidirectional switching elements that conduct in response to a voltage greater than a prescribed voltage are serially connected to said protective resistors, auxiliary interconnecting normal conductive lines are provided in such a manner that a circulating current can be passed through each pair of opposing superconducting coils, a protective resistor is provided in each of said auxiliary interconnecting normal conductive lines and a bidirectional switching element that conducts in response to a voltage greater than a prescribed voltage is serially connected to each of these protective resistors.

13. The apparatus according to claim 4, wherein a bidirectional switching element that conducts in response to a voltage greater than a prescribed voltage is connected in parallel with each series circuit composed of said protective resistor and diode, a current-attenuation adjusting resistor is connected to said interconnecting normal conductive line, and a bidirectional switching element that conducts in response to a voltage greater than a predetermined voltage is serially connected to said current-attenuation adjusting resistor.

14. The apparatus according to claim 13, wherein a resistor is connected to a connecting line between power-supply cables led out from said power supply, and a bidirectional switching element that conducts in response to a voltage greater than a prescribed voltage is serially connected to said resistor.

* * * * *